United States Patent
Amini et al.

(10) Patent No.: US 12,293,583 B2
(45) Date of Patent: May 6, 2025

(54) NOTIFICATION PRIORITY SEQUENCING FOR VIDEO SECURITY

(71) Applicant: Arlo Technologies, Inc., Carlsbad, CA (US)

(72) Inventors: Peiman Amini, Mountain View, CA (US); Joseph Amalan Arul Emmanuel, Cupertino, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 19 days.

(21) Appl. No.: 18/366,325

(22) Filed: Aug. 7, 2023

(65) Prior Publication Data

US 2023/0386207 A1 Nov. 30, 2023

Related U.S. Application Data

(63) Continuation-in-part of application No. 17/358,259, filed on Jun. 25, 2021, now Pat. No. 11,756,390.
(Continued)

(51) Int. Cl.
*G08B 21/00* (2006.01)
*G06V 20/40* (2022.01)
*H04N 23/66* (2023.01)

(52) U.S. Cl.
CPC ............ *G06V 20/44* (2022.01); *G06V 20/46* (2022.01); *H04N 23/66* (2023.01)

(58) Field of Classification Search
CPC ........ G06V 20/44; G06V 20/46; G06V 10/82; G06V 40/20; G06V 20/52; H04N 23/66; H04N 23/661; H04N 7/181; H04N 23/617; H04N 23/80; G06N 3/0464; G06N 3/09; G06N 20/00; G08B 29/186; G08B 13/19658; G08B 13/1966; G08B 13/19684; G08B 25/005; G08B 25/08; H04L 65/80; H04L 45/306; H04L 65/61; H04L 65/70; H04L 65/762; H04W 24/08; H04W 52/0248; H04W 4/02; H04W 24/02;
(Continued)

(56) References Cited

U.S. PATENT DOCUMENTS 7,460,476 B1 12/2008 Morris et al.
7,539,489 B1 5/2009 Alexander
(Continued)

FOREIGN PATENT DOCUMENTS

CN 102355695 A 2/2012
CN 102811367 A 12/2012
(Continued)

OTHER PUBLICATIONS

"Amazon Kinesis Video Streams Developer Guide", Amazon Web Services, Inc., 2018, 136 pp.
(Continued)

*Primary Examiner* — Mark S Rushing
(74) *Attorney, Agent, or Firm* — Perkins Coie LLP

(57) ABSTRACT

Determining a sequence for providing a notification regarding activity recorded by a camera is described. In one aspect, a priority sequence for can be determined based on a variety of characteristics of the available devices registered with the home security system of the camera.

20 Claims, 12 Drawing Sheets

Related U.S. Application Data which is a continuation-in-part of application No. 16/276,422, filed on Feb. 14, 2019, now Pat. No. 11,076,161.

(60) Provisional application No. 62/633,017, filed on Feb. 20, 2018.

(58) Field of Classification Search
CPC ......... H04W 52/0245; H04W 52/0261; H04W 52/028; Y02D 30/70
USPC ...................................................... 340/7.59
See application file for complete search history.

(56) References Cited

U.S. PATENT DOCUMENTS

| | | | |
|---|---|---|---|
| 7,633,869 | B1 | 12/2009 | Morris et al. |
| 8,855,035 | B2 | 10/2014 | Lemoine |
| 9,179,495 | B1 | 11/2015 | Scherzer et al. |
| 9,451,484 | B2 | 9/2016 | Boulton |
| 9,712,814 | B2 | 7/2017 | Tanaka et al. |
| 9,996,750 | B2 | 6/2018 | Campbell |
| 10,033,436 | B2 | 7/2018 | Thubert et al. |
| 10,044,104 | B1 | 8/2018 | Bartko et al. |
| 10,177,965 | B1 | 1/2019 | Joshi |
| 10,425,638 | B2 | 9/2019 | Yu et al. |
| RE47,843 | E | 2/2020 | Fuji |
| 11,228,792 | B1 | 1/2022 | Ram |
| 11,756,390 | B2 | 9/2023 | Amini et al. |
| 2002/0059627 | A1* | 5/2002 | Islam ................... H04L 65/756 348/E7.083 |
| 2002/0105921 | A1 | 8/2002 | Sawyer et al. |
| 2002/0181637 | A1 | 12/2002 | Nakabayashi |
| 2003/0055908 | A1* | 3/2003 | Brown .................... H04L 67/61 709/207 |
| 2003/0063277 | A1 | 4/2003 | Kennedy et al. |
| 2003/0193525 | A1 | 10/2003 | Nygaard |
| 2005/0083947 | A1 | 4/2005 | Vaarala et al. |
| 2005/0086569 | A1 | 4/2005 | Hiddink et al. |
| 2005/0169209 | A1 | 8/2005 | Miu |
| 2007/0153916 | A1 | 7/2007 | Demircin |
| 2008/0020746 | A1 | 1/2008 | Alexandar et al. |
| 2008/0025378 | A1 | 1/2008 | Mahany et al. |
| 2008/0026748 | A1 | 1/2008 | Alexander et al. |
| 2008/0069104 | A1 | 3/2008 | Von et al. |
| 2008/0112315 | A1 | 5/2008 | Hu |
| 2008/0320108 | A1 | 12/2008 | Murty et al. |
| 2009/0022222 | A1 | 1/2009 | He |
| 2009/0273679 | A1 | 11/2009 | Gere et al. |
| 2009/0290019 | A1 | 11/2009 | McNelis et al. |
| 2010/0080205 | A1 | 4/2010 | Hirsch et al. |
| 2010/0097472 | A1 | 4/2010 | Chathukutty et al. |
| 2010/0109934 | A1 | 5/2010 | Drake et al. |
| 2010/0285753 | A1 | 11/2010 | Foegelle |
| 2011/0159865 | A1* | 6/2011 | Nakao ................... H04M 1/575 455/418 |
| 2011/0320555 | A1* | 12/2011 | Qiu ......................... H04L 65/80 709/207 |
| 2012/0021912 | A1 | 1/2012 | Mathews et al. |
| 2012/0210853 | A1 | 8/2012 | Abershitz |
| 2012/0314875 | A1 | 12/2012 | Lee |
| 2013/0053653 | A1 | 2/2013 | Cuddihy et al. |
| 2013/0089039 | A1 | 4/2013 | Vashi et al. |
| 2013/0128947 | A1 | 5/2013 | Fryer et al. |
| 2014/0036993 | A1 | 2/2014 | Bae |
| 2014/0051379 | A1 | 2/2014 | Ganesh et al. |
| 2014/0064120 | A1 | 3/2014 | Sethuraman et al. |
| 2014/0092755 | A1 | 4/2014 | Van De Ven |
| 2014/0115114 | A1 | 4/2014 | Garmark |
| 2014/0169195 | A1 | 6/2014 | Hsin et al. |
| 2014/0169509 | A1 | 6/2014 | Tsofe |
| 2014/0229880 | A1* | 8/2014 | Aradhye ............... G06F 3/0482 715/771 |
| 2014/0240491 | A1 | 8/2014 | Kauniskangas et al. |
| 2014/0269655 | A1 | 9/2014 | Du et al. |
| 2014/0307707 | A1 | 10/2014 | Mestanov |
| 2014/0358592 | A1 | 12/2014 | Wedig et al. |
| 2014/0368601 | A1 | 12/2014 | deCharms |
| 2015/0098354 | A1 | 4/2015 | Perez Grovas |
| 2015/0185857 | A1 | 7/2015 | Jung |
| 2015/0189176 | A1 | 7/2015 | Pacurariu |
| 2015/0229426 | A1 | 8/2015 | Yu et al. |
| 2015/0312572 | A1 | 10/2015 | Owen |
| 2015/0319411 | A1* | 11/2015 | Kasmir .................. H04N 7/186 340/328 |
| 2015/0349859 | A1 | 12/2015 | Emmanuel et al. |
| 2015/0381310 | A1 | 12/2015 | Hammarwall et al. |
| 2016/0105644 | A1 | 4/2016 | Smith |
| 2016/0112935 | A1 | 4/2016 | Ahuja et al. |
| 2016/0114887 | A1 | 4/2016 | Zhou |
| 2016/0125714 | A1 | 5/2016 | Kates et al. |
| 2016/0165662 | A1 | 6/2016 | Dagen et al. |
| 2016/0225158 | A1 | 8/2016 | Tsubota |
| 2016/0243441 | A1 | 8/2016 | Garbowski |
| 2016/0262120 | A1 | 9/2016 | Bhani et al. |
| 2016/0278104 | A1 | 9/2016 | Hiremath et al. |
| 2016/0337243 | A1 | 11/2016 | Cui et al. |
| 2016/0366702 | A1 | 12/2016 | Baba et al. |
| 2017/0055179 | A1 | 2/2017 | Radunovic et al. |
| 2017/0070732 | A1 | 3/2017 | Roulet et al. |
| 2017/0078242 | A1 | 3/2017 | Nakamura et al. |
| 2017/0180442 | A1 | 6/2017 | Lawrence |
| 2017/0192700 | A1 | 7/2017 | Wozniak |
| 2017/0237673 | A1 | 8/2017 | Law |
| 2017/0242129 | A1 | 8/2017 | Kallankari et al. |
| 2017/0244712 | A1 | 8/2017 | Meredith et al. |
| 2017/0301201 | A1 | 10/2017 | Siann |
| 2017/0301203 | A1 | 10/2017 | Matsuura |
| 2018/0206176 | A1 | 7/2018 | Panteleev |
| 2018/0254099 | A1 | 9/2018 | Beydoun et al. |
| 2018/0306904 | A1 | 10/2018 | Vacanti |
| 2018/0375594 | A1 | 10/2018 | Matsuura |
| 2018/0316573 | A1 | 11/2018 | Marshal |
| 2018/0359727 | A1 | 12/2018 | Hori |
| 2018/0374494 | A1 | 12/2018 | Kidal et al. |
| 2019/0014005 | A1 | 1/2019 | Lessmann |
| 2019/0014388 | A1 | 1/2019 | Rutledge |
| 2019/0132371 | A1 | 6/2019 | Wu |
| 2019/0200013 | A1 | 6/2019 | Wu et al. |
| 2019/0162769 | A1 | 7/2019 | Li et al. |
| 2019/0222897 | A1 | 7/2019 | Frusina et al. |
| 2019/0261370 | A1 | 8/2019 | Amini et al. |
| 2019/0282897 | A1 | 9/2019 | Posin |
| 2019/0364505 | A1 | 11/2019 | Wang |
| 2022/0122149 | A1 | 4/2022 | Kim et al. |

FOREIGN PATENT DOCUMENTS

| | | |
|---|---|---|
| CN | 103493397 A | 1/2014 |
| CN | 104066146 A | 9/2014 |
| CN | 105246131 A | 1/2016 |
| CN | 106534634 A | 3/2017 |
| CN | 106954026 A | 7/2017 |
| CN | 107370550 A | 11/2017 |
| CN | 107370550 B | 11/2017 |
| CN | 110177393 A | 8/2019 |
| CN | 110177835 A | 8/2019 |
| JP | 2010232819 A | 10/2010 |
| WO | 2006075052 A1 | 7/2006 |
| WO | 2009048660 A2 | 4/2009 |
| WO | 2015144016 | 10/2015 |

OTHER PUBLICATIONS

Anathanarayanan, Ganesh, et al., "Real-time Video Analytics—the killer app for edge computing", Microsoft Research; IEEE computer Society, 11 pages.

Girshick, Ross "Fast R-CNN Object detection with Caffe", Microsoft Research, 30 pages.

Hosseini, Hossein, et al. "Attacking Automatic Video Analysis Algorithms: A Case Study of Google Cloud Video Intelligence

(56) References Cited

OTHER PUBLICATIONS

API", University of Washington, Seattle, WA, Worcester Polytechnic Institute, Worcester, MA, 12 pages.

* cited by examiner

NOTIFICATION PRIORITY SEQUENCING FOR VIDEO SECURITY

CROSS-REFERENCE TO RELATED APPLICATION(S)

This application is a continuation-in-part of U.S. patent application Ser. No. 17/358,259, entitled "Notification Priority Sequencing for Video Security," and filed on Jun. 25, 2021, which is a continuation application of U.S. patent application Ser. No. 16/276,422, entitled "Notification Priority Sequencing for Video Security," and filed on Feb. 14, 2019, which claims priority to U.S. Provisional Patent Application No. 62/633,017, entitled "Optimization and Testing of Wireless Devices," and filed on Feb. 20, 2018. The content of the above-identified applications are incorporated herein by reference in their entirety.

TECHNICAL FIELD

The disclosure relates to security systems, and in particular providing notifications to field devices regarding video data.

BACKGROUND

Security systems for home or business uses can include a base station in communication with cameras mounted within or outside of a structure to record activity. When relevant or alarming activity is determined to be occurring, a user might be notified regarding the occurrence of the activity, and whether any action should be taken.

Multiple users might be registered with the security system. At times, only a single notification to one user might be provided, for example, when a visitor is at a door to the home or business. A notification can include video data depicting the visitor at the door and the user receiving the notification can use an electronic device (e.g., a smartphone) to receive the notification and to verbally communicate with the visitor via the camera and base station. However, if one user receives the notification but does not respond, the activity might not be addressed even though another user registered with the security system might have been available to receive a notification and respond. Thus, the robustness of the security system can be degraded.

SUMMARY

The methods, systems, and apparatuses disclosed herein include implementations of notification priority sequencing for video security. Some of the subject matter described herein includes a method including receiving video data indicative of activity captured within a field of view of a camera; determining characteristics of a first device and a second device associated with a security system related to the camera; determining, by a processor, a priority sequence for providing a notification regarding occurrence of the activity based on the characteristics, the priority sequence indicating that a first device is to be provided the notification before a second device; providing the notification to the first device; receiving a response from the first device, the response indicating an action to be performed in response to the occurrence of the activity; and performing the action based on the response indicating that the action is to be performed in response to the occurrence of the activity.

In some implementations, a camera captures video at a particular time. Information identifying the camera and the particular time is embedded within the video. A feature vector is extracted from the video. The feature vector describes characteristics of the camera and the particular time. A machine learning model embedded in the camera determines a priority sequence, based on the feature vector, for providing a notification to at least one of a plurality of user devices. The machine learning model is trained based on user preferences and characteristics of the camera. The user preferences are related to the particular time. Determining the priority sequence is performed using edge computing. The notification is sent to the at least one of the plurality of user devices based on the priority sequence.

In some implementations, the camera generates an extended-reality version of the video based on the user preferences. The extended-reality version of the video is sent to the at least one of the plurality of user devices.

In some implementations, the camera generates the notification, using a generative artificial intelligence (AI) model, based on an event depicted by the video.

In some implementations, the camera receives, from the at least one of the plurality of user devices, a request to access the camera using an identifier based on self-sovereign identity.

In some implementations, the at least one of the plurality of user devices is an extended-reality headset.

In some implementations, the camera retrieves, from a cloud server, a first location of a first user device of the plurality of user devices and a second location of a second user device of the plurality of user devices. Determining the priority sequence is based on the first location and the second location.

In some implementations, determining characteristics of the user devices includes: determining a first network bandwidth available to the first device and a second network bandwidth available to the second device, and wherein the first network bandwidth is higher than the second network bandwidth.

In some implementations, determining the characteristics includes: determining a first location of the first device and a second location of the second device, and wherein the first location is a first location type, the second location is a second location type, one of the first location type or the second location type being residential and the other being commercial.

In some implementations, determining the characteristics includes: determining first operational characteristics of the first device and second operational characteristics of the second device, the first operational characteristics being different than the second operational characteristics, and the priority sequence based on the first operational characteristics and the second operational characteristics.

In some implementations, the first operational characteristics include a first video processing functionality of the first device, and the second operational characteristics include a second video processing functionality of the second device, the first video processing functionality providing a higher quality video processing than the second video processing functionality.

In some implementations, determining the characteristics includes: determining a first history of the first device responding to previous notifications and a second history of the second device responding to previous notifications, and wherein the priority sequence is based on the first history and the second history.

In some implementations, wherein the notification is a voice call placed to the first device, and the action performed is to contact emergency services in response to the occurrence of the activity.

Some of the subject matter described herein includes an electronic device, comprising: one or more processors; and memory storing instructions, wherein the processor is configured to execute the instructions such that the processor and memory are configured to: receive video data indicative of activity captured within a field of view of a camera; determine characteristics of a first device and a second device associated with a security system related to the camera; determine a priority sequence for providing a notification regarding occurrence of the activity based on the characteristics, the priority sequence indicating that a first device is to be provided the notification before a second device; provide the notification to the first device; receive a response from the first device, the response indicating an action to be performed in response to the occurrence of the activity; and perform the action based on the response indicating that the action is to be performed in response to the occurrence of the activity.

In some implementations, determining the characteristics includes: determine a first network bandwidth available to the first device and a second network bandwidth available to the second device, and wherein the first network bandwidth is higher than the second network bandwidth.

In some implementations, determining the characteristics includes: determine a first location of the first device and a second location of the second device, and wherein the first location is a first location type, the second location is a second location type, one of the first location type or the second location type being residential and the other being commercial.

In some implementations, determining the characteristics includes: determine first operational characteristics of the first device and second operational characteristics of the second device, the first operational characteristics being different than the second operational characteristics, and the priority sequence based on the first operational characteristics and the second operational characteristics.

In some implementations, the first operational characteristics include a first video processing functionality of the first device, and the second operational characteristics include a second video processing functionality of the second device, the first video processing functionality providing a higher quality video processing than the second video processing functionality.

In some implementations, determining the characteristics includes: determine a first history of the first device responding to previous notifications and a second history of the second device responding to previous notifications, and wherein the priority sequence is based on the first history and the second history.

In some implementations, the notification is a voice call placed to the first device, and the action performed is to contact emergency services in response to the occurrence of the activity.

Some of the subject matter described herein includes a computer program product including one or more non-transitory computer-readable media storing computer program instructions, execution of which by a processing system causes the processing system to perform operations comprising: receive video data indicative of activity captured within a field of view of a camera; determine characteristics of a first device and a second device associated with a security system related to the camera; determine a priority sequence for providing a notification regarding occurrence of the activity based on the characteristics, the priority sequence indicating that a first device is to be provided the notification before a second device; provide the notification to the first device; receive a response from the first device, the response indicating an action to be performed in response to the occurrence of the activity; and perform the action based on the response indicating that the action is to be performed in response to the occurrence of the activity.

In some implementations, determining the characteristics includes: determine a first network bandwidth available to the first device and a second network bandwidth available to the second device, and wherein the first network bandwidth is higher than the second network bandwidth.

In some implementations, determining the characteristics includes: determine a first location of the first device and a second location of the second device, and wherein the first location is a first location type, the second location is a second location type, one of the first location type or the second location type being residential and the other being commercial.

In some implementations, determining the characteristics includes: determine first operational characteristics of the first device and second operational characteristics of the second device, the first operational characteristics being different than the second operational characteristics, and the priority sequence based on the first operational characteristics and the second operational characteristics.

In some implementations, the first operational characteristics include a first video processing functionality of the first device, and the second operational characteristics include a second video processing functionality of the second device, the first video processing functionality providing a higher quality video processing than the second video processing functionality.

In some implementations, determining the characteristics includes: determine a first history of the first device responding to previous notifications and a second history of the second device responding to previous notifications, and wherein the priority sequence is based on the first history and the second history.

Figure 1:
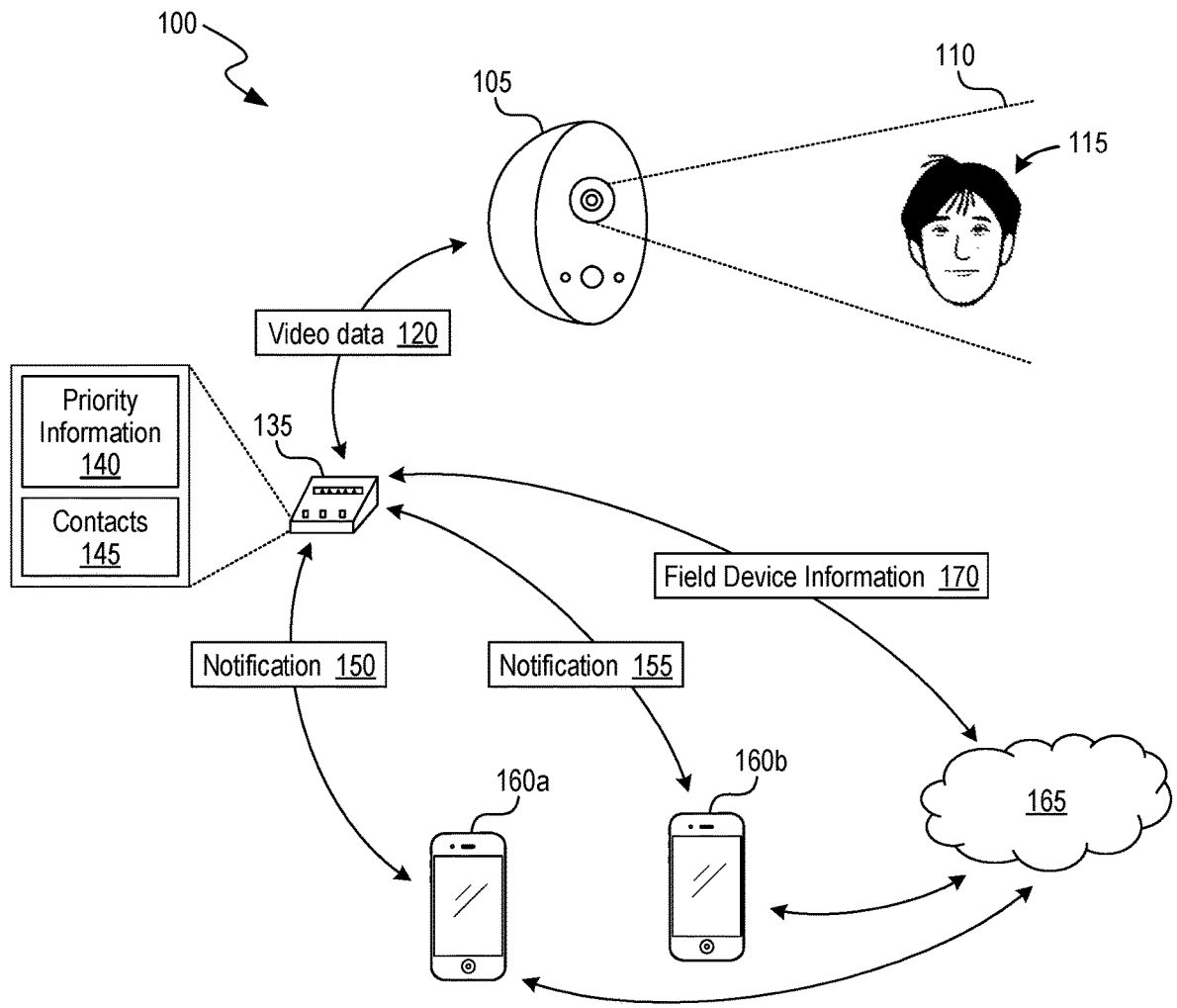
FIG. 1 is a drawing illustrating an example environment for generating a notification regarding an activity depicted in video data, in accordance with one or more embodiments.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Embodiments of the present disclosure will be described more thoroughly from now on with reference to the accompanying drawings. Like numerals represent like elements throughout the several figures, and in which example embodiments are shown. However, embodiments of the claims can be embodied in many different forms and should not be construed as limited to the embodiments set forth herein. The examples set forth herein are non-limiting examples and are merely examples, among other possible examples. Throughout this specification, plural instances (e.g., "610") can implement components, operations, or structures (e.g., "610*a*") described as a single instance. Further, plural instances (e.g., "610") refer collectively to a set of components, operations, or structures (e.g., "610*a*") described as a single instance. The description of a single component (e.g., "610*a*") applies equally to a like-numbered component (e.g., "610*b*") unless indicated otherwise. These and other aspects, features, and implementations can be expressed as methods, apparatuses, systems, components, program products, means or steps for performing a function, and in other ways. These and other aspects, features, and implementations will become apparent from the following descriptions, including the claims.

This disclosure describes techniques for determining which user is to be selected for being provided a notification regarding activity captured by a camera of a security system. In one example, a family can have a home security system including a base station in communication with cameras inside and outside the home. When alarming or eventful activity is captured by one of the cameras, the base station can determine this and generate data to provide a notification with video data depicting the activity. Additionally, the base station can include communication capabilities to contact a user regarding the activity, for example, by placing a cellular phone call to verbally alert the user to the situation at the home. The user can respond to the notification, for example, by verbally instructing the base station to place a call to emergency services (e.g., call police via "911").

In some embodiments, a computer system receives a video captured by a camera at a particular time. Information identifying the camera and the particular time is embedded within the video. A feature vector is extracted from the video. The feature vector describes characteristics of the camera and the particular time. A machine learning model is used to determine a priority sequence, based on the feature vector, for providing a notification, based on the video, to at least one of a plurality of user devices. The machine learning model is trained based on user preferences and characteristics of the camera. The notification is sent to the at least one of the plurality of user devices based on the priority sequence.

In some embodiments, the computer system and the machine learning model are embedded within the camera. Determining the priority sequence is performed using edge computing.

In some embodiments, an extended-reality version of the video is generated based on the user preferences. The user preferences are related to the particular time. The extended-reality version of the video is sent to the at least one of the plurality of user devices.

In some embodiments, the computer system is implemented on a base station. The notification is generated using a generative artificial intelligence (AI) model based on an event depicted by the video.

In some embodiments, a base station receives, from the at least one of the plurality of user devices, a request to access the camera using an identifier based on self-sovereign identity.

In some embodiments, the at least one of the plurality of user devices is an extended-reality headset.

In some embodiments, the base station retrieves, from a cloud server, a first location of a first user device of the plurality of user devices and a second location of a second user device of the plurality of user devices. Determining the priority sequence is based on the first location and the second location.

In some embodiments, a base station receives video, from a camera, at a particular time. Information identifying the camera and the particular time is embedded within the video. A feature vector is extracted from the video. The feature vector describes characteristics of the camera and the particular time. The base station generates, using a machine learning model, an extended-reality version of the video based on the feature vector and user preferences. In some embodiments, the machine learning model is used to determine a priority sequence, based on the feature vector, for providing the extended-reality version of the video to at least one of a plurality of user devices. The extended-reality version of the video is sent to the at least one of the plurality of user devices based on the priority sequence.

In some embodiments, the machine learning model is trained based on the user preferences and the characteristics of the camera.

In some embodiments, the machine learning model is a generative artificial intelligence (AI) model, and the extended-reality version of the video is based on an event depicted by the video.

In some embodiments, the base station receives, from the at least one of the plurality of user devices, a request to access the camera using an identifier based on self-sovereign identity.

In some embodiments, the at least one of the plurality of user devices is an extended-reality headset.

In some embodiments, the base station retrieves, from a cloud server, a first location of a first user device of the plurality of user devices and a second location of a second user device of the plurality of user devices. Determining the priority sequence is based on the first location and the second location.

In some embodiments, the user preferences are related to the particular time.

The advantages and benefits of the methods, systems, and apparatuses disclosed herein include prioritizing users based on factors including their history of responding to notifications, current location, network bandwidth available to their device at the current location, and operational characteristics of their device (e.g., an electronic device such as a smartphone, a tablet, a laptop computer, a desktop computer, a smartwatch, etc.). The cameras and imaging systems disclosed use computer networks, the Internet, intranets, and supporting technologies to implement a cost-effective technology to collect, transmit, store, analyze, and use imaging information in electronic formats. As a result, by prioritizing users to receive notifications, a base station can provide a more robust security system because a user more likely to view and respond to the notification can be prioritized over other users. This can improve the user experience of the security system implemented by the base station.

Because a family or business can have multiple users that can be contacted to provide a notification, the base station can determine a sequence or priority of providing notifications to users such that only some (e.g., not all) of the users can be contacted. For example, in some activities such as a visitor being detected at the front door, a single user might be contacted via a notification to be provided video data depicting the visitor as well as offered the capability to communicate to the visitor via a speaker and microphone of a camera positioned at the front door.

In some implementations, the characteristics of the notification can also be determined using the aforementioned factors for prioritizing the users to be provided notifications. For example, the type of notification (e.g., whether the notification includes a verbal alert asking the user whether emergency services should be called), a type of compression to use for providing video data, etc.), and other characteristics can be determined by the base station.

FIG. 1 is a drawing illustrating an example environment 100 for generating a notification regarding an activity depicted in video data, in accordance with one or more embodiments. In more detail, FIG. 1 illustrates an example of generating a notification regarding an activity depicted in video data. In environment 100, base station 135 can be in wireless communication with camera 105 (e.g., using one of the Institute of Electrical and Electronics Engineers (IEEE) 802.11 wireless local area network (WLAN) standards, a personal area network standard such as Bluetooth, etc.). Portions of environment 100 are implemented using the components of the example computer system 1000 illustrated and described in more detail with reference to FIG. 10. Likewise, embodiments of environment 100 can include different and/or additional components or can be connected in different ways.

Camera 105 can include an image sensor capable of capturing image information used to generate video data of activity occurring within field of vision 110. In environment 100, this can include generating video data 120 depicting visitor 115 at a front door of a home. Video data 120 can be provided to base station 135 and base station 135 can analyze the content of video data 120 to determine that visitor 115 is at the front door. A visitor at the front door can be an activity that a user from the home should be aware of and, therefore, base station 135 can generate a notification to be provided to the user such that the activity can be responded to, for example, by enabling a two-way audio conversation using a microphone and a speaker of camera 105 to communicate with visitor 115.

However, the home might be a residence for multiple people. For example, in environment 100, device 160a might be the smartphone of one resident of the home, and device 160b might be the smartphone of another resident of the home. Only a single user should be allowed to have a conversation with visitor 115 and, therefore, base station 135 can determine which of device 160a or 160b can be provided notification 150 or 155, respectively, to provide an alert regarding visitor 115.

The possible users who can be contacted can be stored by base station 135 as contacts 145 in environment 100. Base station 135 can further determine priority information 140 which can be a sequence of providing notifications to users based on a determined priority. In some implementations, priority information 140 can be updated using a hidden Markov model (HMM), Viterbi's algorithm, or other machine learning or artificial intelligence techniques to predict which user should be provided a notification by determining the priorities. Example machine learning and artificial intelligence techniques for implementing notification priority sequencing for video security are illustrated and described in more detail with reference to FIG. 9.

For example, base station 135 can determine a variety of factors regarding how users have responded to notifications in the past, a current location of a user or device, network bandwidth available to a device at the current location, and operational characteristics of the device such as its battery life and functional capabilities (e.g., video processing functionalities including the types of video codecs or other multimedia capabilities used by the device). Based on these factors, priority information 140 can be generated and used to provide a notification.

For example, if video data 120 depicting visitor 115 is received by base station 135 at 9:00 a.m. on a Friday, base station might determine that device 160a should be prioritized over device 160b in being provided notification 150 because device 160a has in the past responded to notifications on weekday mornings while device 160b has not. For example, in the past at 9:00 a.m. on a Friday, the user of device 160a might have reviewed a notification and indicated that the activity that the notification is regarding is alarming (e.g., emergency services should be called). However, if the same activity occurred at 8:00 p.m. on a Saturday, then device 160b might be prioritized over device 160a and provided notification 155 due to having a history of responding to more notifications at that time. Thus, over time, base station 135 can learn which user to provide a notification using a variety of machine learning or artificial intelligence techniques to learn the schedules of various users.

In addition to how users respond to notifications on their devices over history, other factors can also be considered. For example, devices 160a and 160b can include software installed to communicate with cloud server 165. Cloud server 165 can be a cloud-based network server collecting data from devices 160a and 160b that can then be provided to base station 135. For example, cloud server 165 can receive geographical information such as a current location of the devices. This information can then be provided to base station 135. However, in other implementations, this information can be transmitted from devices 160*a* and 160*b* to base station 135 without the use of cloud server 165.

The network bandwidth available to devices 160*a* and 160*b* can also be provided to base station 135 in a similar manner. The network bandwidth can be used by base station 135 to determine the data transfer rate available to communicate with devices 160*a* and 160*b*. The network bandwidth of the devices can then be used to generate priority information 140. For example, the device with a higher network bandwidth can be prioritized over the other device. This can allow for an increase likelihood that a high-quality video can be viewed by the device with the higher network bandwidth rather than the device with the lower network bandwidth viewing a lower-quality video.

The current location of devices 160*a* and 160*b* can also be provided to base station 135 in a similar manner and used to generate priority information 140. For example, if device 160*a* is determined to be in an office and device 160*b* is in a car along a road, then device 160*a* might be prioritized over device 160*b* because being in an office might offer a better opportunity to respond to the notification. Commercial or business locations can be prioritized over residential locations, or vice versa.

The operational characteristics of devices 160*a* and 160*b* can also be provided to base station 135 in a similar manner. For example, the battery level of devices 160*a* and 160 can be used by base station 135 to generate priority information 140. In one example, if the battery level of device 160*a* is below a threshold (e.g., less than ten percent) and device 160*b* is above the threshold, then device 160*b* can be prioritized because it has a higher battery level and, therefore, might be able to more reliably view the notification, and provide a response without having the battery of device 160*b* run out of charge.

Other operational characteristics can include the capabilities of the devices. For example, a device that can process higher-quality video data can be prioritized over a device that does not have the capability to process higher-quality video data. Thus, the video processing capabilities of the devices can be used to determine the sequence.

Figure 2:
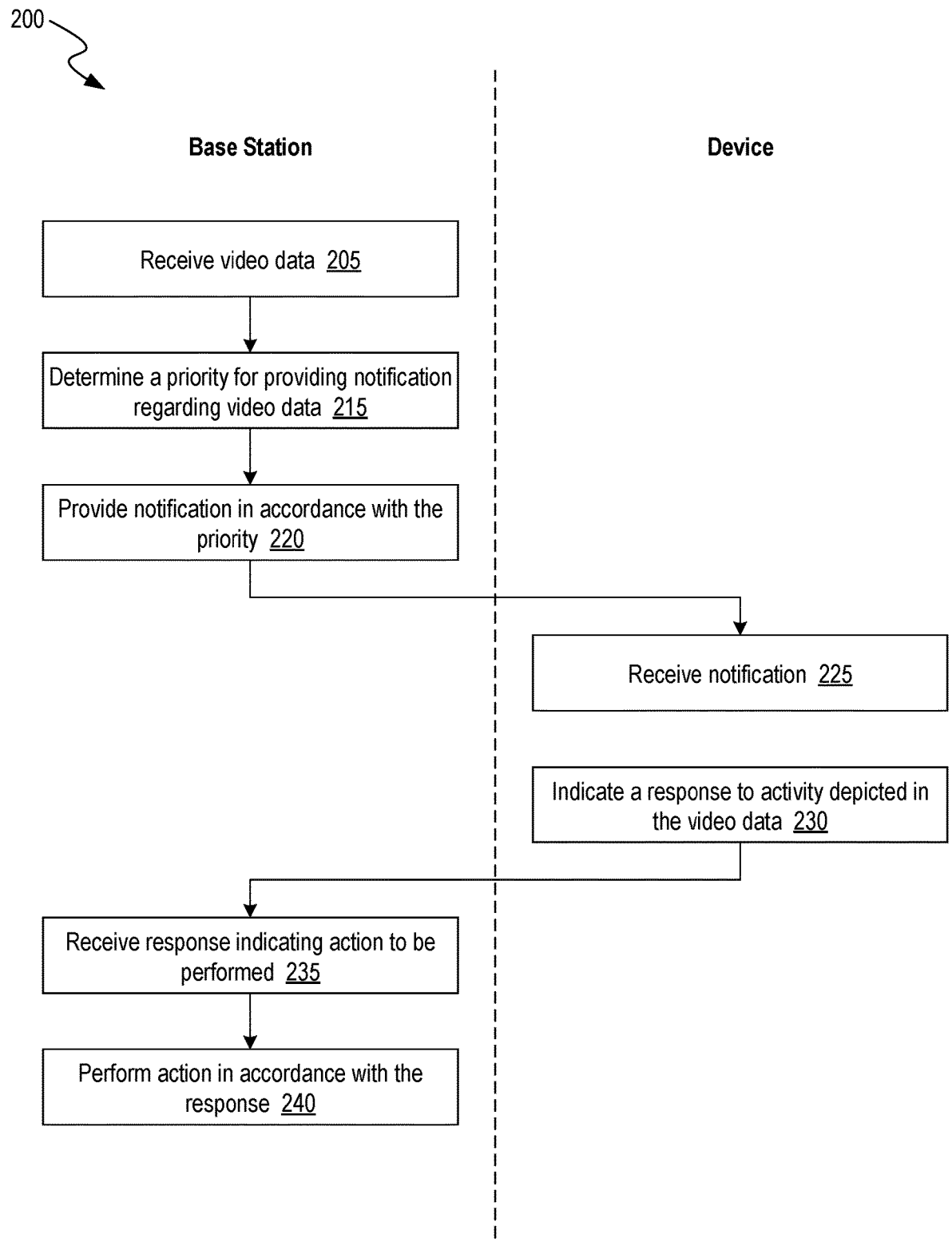
FIG. 2 is a flow diagram illustrating an example process for notification priority sequencing for video security, in accordance with one or more embodiments of this disclosure.

FIG. 2 is a flow diagram illustrating an example process 200 for notification priority sequencing for video security, in accordance with one or more embodiments of this disclosure. Process 200 can be used for generating a notification. In some embodiments, the process 200 of FIG. 2 is performed by base station 135 illustrated and described in more detail with reference to FIG. 1. In other embodiments, the process 200 of FIG. 2 is performed by a computer system, e.g., the example computer system 1000 illustrated and described in more detail with reference to FIG. 10. Particular entities, for example, camera 105 or devices 160 perform some or all of the steps of the process 200 in other embodiments. Camera 105 and devices 160 are illustrated and described in more detail with reference to FIG. 1. Likewise, embodiments can include different and/or additional steps, or perform the steps in different orders.

In some implementations, a computer system receives a video captured by a camera (e.g., camera 105 of FIG. 1) at a particular time. Information describing the particular time is embedded within the video by the camera. Examples of embedded information within a video are described in more detail with reference to FIG. 11. For example, in process 200, video data can be received by a base station (205). In environment 100 (illustrated and described in more detail with reference to FIG. 1), video data 120 can be generated by camera 105 and provided to base station 135.

In some implementations, a feature vector is extracted from the video. Example feature extraction is illustrated and described in more detail with reference to FIG. 9. The feature vector describes an event depicted by the video and the particular time. Example events captured by video are described in more detail with reference to FIG. 11. In some embodiments, base station 135 can then determine a priority for providing a notification regarding the video data (215). For example, base station 135 can identify, using contacts 145, that one or both of device 160*a* and device 160*b* should be provided notification 150 or notification 155, respectively, to alert a user regarding activity depicted in video data 120. Generating the priority can be based on a variety of factors.

The computer system determines a priority sequence for providing a notification, based on the video, to at least one of multiple user devices. The priority sequence is determined using a machine learning model based on the feature vector. In some implementations, the computer system and the machine learning model are embedded within the camera. Determining the priority sequence is performed using edge computing. Edge computing is described in more detail with reference to FIG. 11. Example machine learning techniques are described in more detail with reference to FIG. 9. In some embodiments, the machine learning model is trained based on user preferences and characteristics of the user devices. Example user preferences are described in more detail with reference to FIG. 11. Example characteristics of user devices are described in more detail with reference to FIG. 1.

In some embodiments, the computer system is implemented on a base station. The base station generates the notification, using a generative artificial intelligence (AI) model, based on an event depicted by the video. Generative AI models are described in more detail with reference to FIG. 9.

Figure 3:
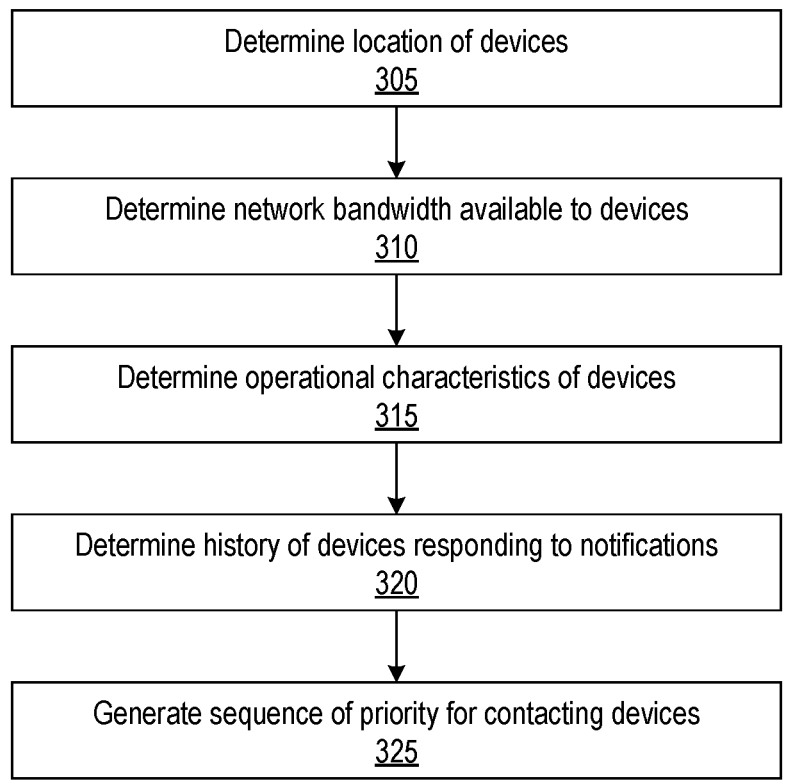
FIG. 3 is a flow diagram illustrating an example process for generating a sequence for contacting field devices in accordance with a priority ranking, in accordance with one or more embodiments.

FIG. 3 is a flow diagram illustrating an example process 300 for generating a sequence for contacting field devices in accordance with a priority ranking, in accordance with one or more embodiments. In some embodiments, the process 300 of FIG. 3 is performed by base station 135 illustrated and described in more detail with reference to FIG. 1. In other embodiments, the process 300 of FIG. 3 is performed by a computer system, e.g., the example computer system 1000 illustrated and described in more detail with reference to FIG. 10. Particular entities, for example, camera 105 or devices 160 perform some or all of the steps of the process 300 in other embodiments. Camera 105 and devices 160 are illustrated and described in more detail with reference to FIG. 1. Likewise, embodiments can include different and/or additional steps, or perform the steps in different orders.

In process 300, the location of devices can be determined (305), the network bandwidth available to devices can be determined (310), operational characteristics of the devices can be determined (315), and the history of the devices responding to previous notifications can be determined (320). One or more of these factors can be used to generate a sequence of priority for contacting the devices (325).

Returning to FIG. 2, a notification in accordance with the priority can be provided (220) and a device can receive the notification (225). The notification can be a message that is displayed in a graphical user interface (GUI) on the device. In some implementations, the message can indicate the activity (e.g., an intruder detected on a camera, motion detected, movement depicted in an object on a camera, etc.), provide a video depicting the activity, and even provide audio playback (along with the video playback) as well as offer two-way audio communication, as previously discussed. A notification can also include a phone call with a verbal prompt asking for the user of the device to provide a response, for example, to verbally indicate whether emergency services should be called, whether it is a false alarm, etc.

Additionally, the characteristics of the notification can be based on any of the aforementioned factors. For example, if the network bandwidth available for the device is lower than a threshold, then a still image of the activity might be provided, but if the network bandwidth is high then video playback can be provided. In another implementation, audio might not be provided if the network bandwidth available to the device is low. Thus, the content of the notification can be based on the aforementioned factors.

Additionally, the type of notification (e.g., text message, message via the operating system (OS) or application installed on the device, phone call, etc.) can also be based on the aforementioned factors. For example, if the device is in a location with an acceptable cellular network coverage, then a phone call can be placed to the device (by the base station) to provide the notification. However, if the device is not within an acceptable cellular network coverage, or if the network bandwidth of the cellular connection is not acceptable, then another type of notification can be provided.

The user of the device can then indicate a response to the activity depicted in the video data (230). For example, the activity can be deemed to be a security incident and indicate that emergency services should be called, an alarm should be triggered to turn on within the home, or other security-related activity.

The base station can then receive the response indicating the action to be performed (235) and then perform the action in accordance with the response (240).

Though some of the examples describe a sequence of priority for contacting devices one-at-a-time, in other implementations, multiple devices can be provided notifications at the same or similar times. For example, two devices might be provided a notification first, and if neither of the two devices respond, then a third device can be notified next.

A base station can also determine characteristics of the video data and generate the priority for notifications. For example, the content of the video data can be analyzed by the base station to determine whether unidentified people are depicted, whether animals are depicted, movement of objects, etc. Thus, different types of content can be used to adjust the notification priority. For example, if people are detected, then a parent of the home can be contacted, but if an animal is detected then children of the home can be provided the notification.

In some implementations, multiple cameras can be placed within and outside of the home. As activity is detected, video data can be generated and provided by these different cameras to the base station. The camera being used to generate the video data (i.e., the camera detecting a possible security-related incident) can be determined and used to determine the priority of notifications. For example, activity occurring outside of the home can have one priority sequence, but activity then occurring within the home can result in a different priority sequence. This would result in different devices being prioritized based on the location of the activity.

In another example, activity outside of the home can result in a sequential priority in which one device can be contacted at a time, as previously discussed. However, activity within the home can result in every device to be contacted. Thus, different levels of security awareness can be provided and different levels can result in different priorities.

In some implementations, base station 135 and camera 105 can be communicatively coupled with a wireless mesh network within the home. The wireless mesh network can have a variety of nodes implementing a network topology to provide wireless communications to devices within and outside of the home.

Figure 4:
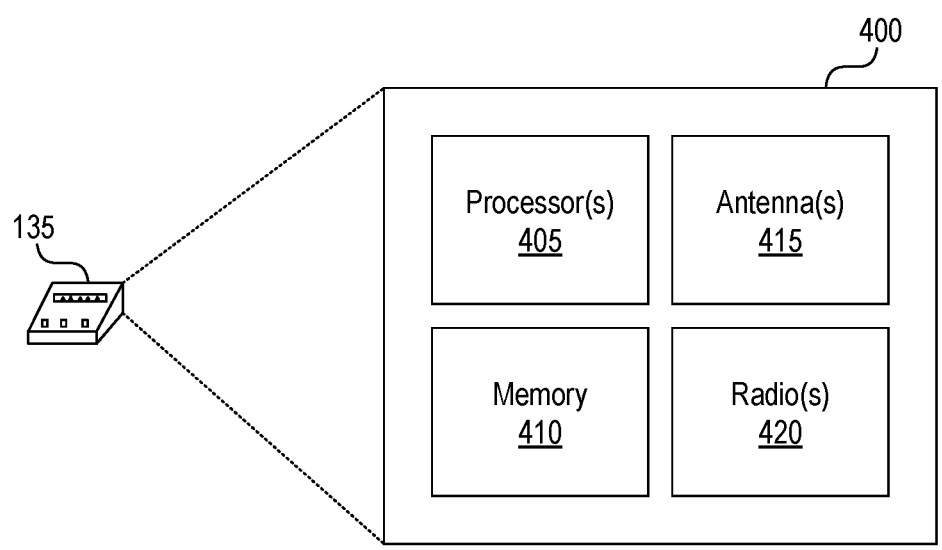
FIG. 4 is a block diagram illustrating an example electronic device which may be used with some implementations, in accordance with one or more embodiments.

FIG. 4 is a block diagram illustrating an example electronic device 400 which may be used with some implementations, in accordance with one or more embodiments. The electronic device 400 is implemented using the components of the example computer system 1000 illustrated and described in more detail with reference to FIG. 10. Likewise, embodiments of the electronic device 400 can include different and/or additional components or can be connected in different ways.

The electronic device 400 of FIG. 4 can implement any of the functionalities and features discussed above, including that of base station 135. In some implementations, electronic device 400 implements the other devices described herein, such as cameras and radar sensors. The processing system can be a system that can run any of the methods/algorithms/techniques described above.

In the illustrated embodiment, electronic device 400 includes one or more processors 405, memory 410, antenna 415, and one or more radios 420. Processors 405 may be or include, for example, one or more general-purpose programmable microprocessors or microprocessor cores, microcontrollers, application specific integrated circuits (ASICs), programmable gate arrays, or the like, or a combination of such devices. The processor(s) 405 control the overall operation of the processing device 400. Memory 410 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 410 may store data and instructions that configure the processor(s) 405 to execute operations in accordance with the techniques described above. Processing device 400 can also include communication devices that may be or include, for example, an Ethernet adapter, cable modem, Wi-Fi adapter, cellular transceiver, Bluetooth transceiver, or the like, or a combination thereof. Depending on the specific nature and purpose of the electronic device 400, it can also include I/O devices that can include devices such as a display (which may be a touch screen display), audio speaker, keyboard, mouse or other pointing device, microphone, camera, etc. Electronic device 400 can also include radios 420, for example, a different radio for each band that communication links can be established within. Electronic device 400 can also include one or more antennas 415 for aiding the establishing of the communication links. For example, radio 420 can generate a signal that is transmitted via antenna 415.

Figure 5:
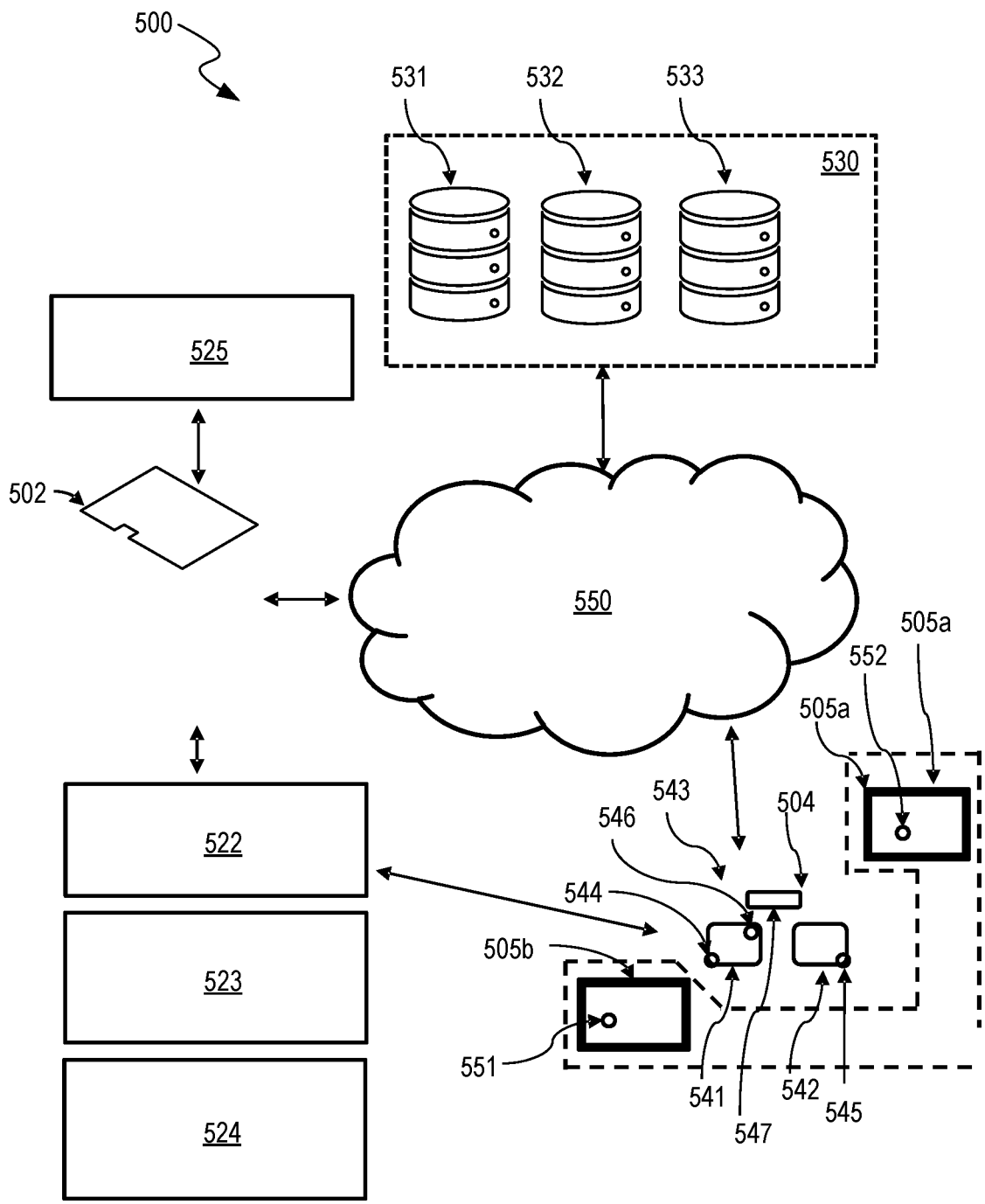
FIG. 5 is a block diagram illustrating an example extended-reality (XR) system, in accordance with one or more embodiments.

FIG. 5 is a block diagram illustrating an example extended-reality (XR) system 500, in accordance with one or more embodiments. Extended reality is a catch-all term to refer to augmented reality, virtual reality, and mixed reality. The technology is intended to combine or mirror the physical world with a "digital twin world" that is able to interact with each other. System 500 can be used to perform an XR computer-implemented method. For example, system 500 can be used in conjunction with implementations of notification priority sequencing for video security, etc. Example implementations of notification priority sequencing for video security are described in more detail with reference to FIGS. 1-4.

System 500 can be used to train machine learning (ML) systems. Example machine learning and artificial intelligence techniques for implementing notification priority sequencing for video security are illustrated and described in more detail with reference to FIG. 9. In some embodiments, system 500 receives video from a camera at a particular time. Information identifying the camera and the particular time is embedded within the video. The information identifying the camera can specify a location of the camera. A feature vector is extracted from the video. Example feature extraction is described in more detail with reference to FIG. 9. The feature vector describes an event depicted by the video (e.g., a cat jumping into a backyard of a house or a delivery person walking down a driveway) and the particular time.

System 500 can use a machine learning model to generate a priority sequence, based on the feature vector, for providing a notification, based on the video, to at least one of multiple user devices, e.g., devices 160 illustrated and described in more detail with reference to FIG. 1. The priority sequence is the same as or similar to priority information 140 are illustrated and described in more detail with reference to FIG. 1. Examples of providing notifications are described in more detail with reference to FIGS. 1-3. In some implementations, the machine learning model is trained based on user preferences and characteristics of the user devices. Example machine learning training methods are described in more detail with reference to FIG. 9. Example user preferences are described in more detail with reference to FIG. 11. Example characteristics of user devices are described in more detail with reference to FIG. 1. The notification is sent to the at least one of the user devices based on the priority sequence.

Figure 6:
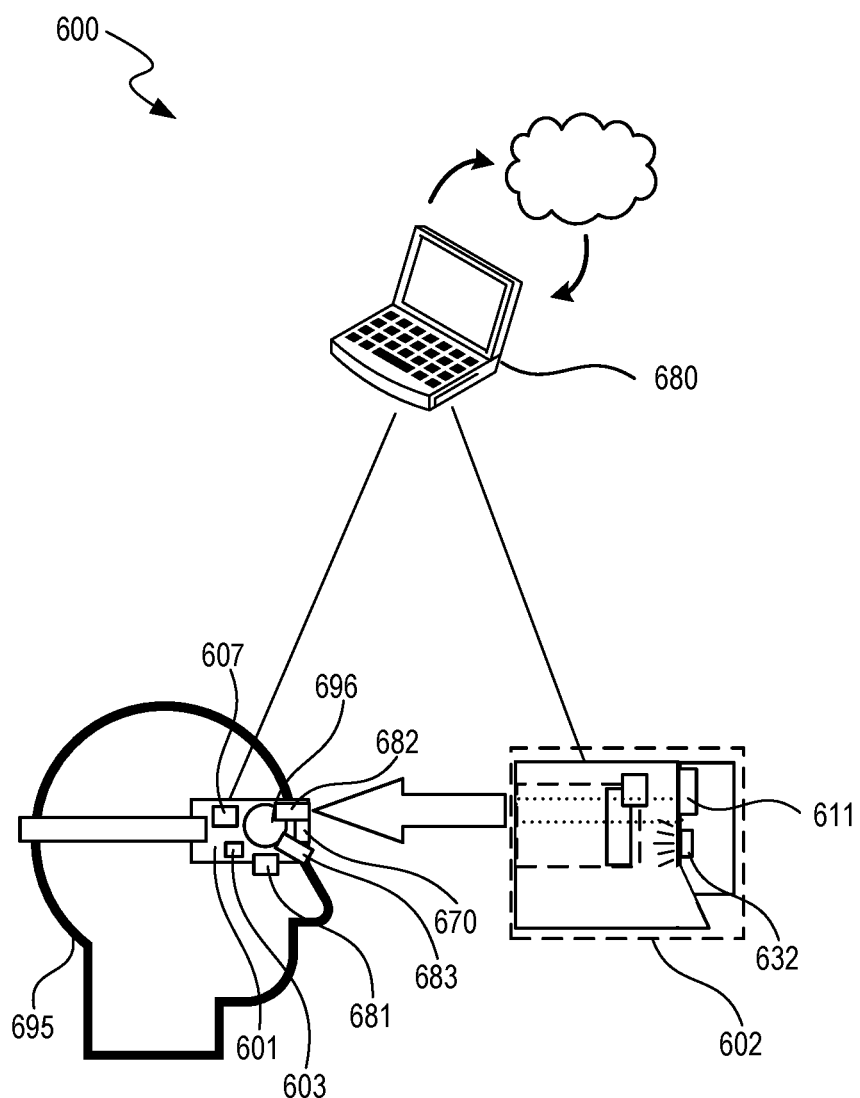
FIG. 6 is a drawing illustrating an example XR head mounted display (HMD), in accordance with one or more embodiments.

A machine learning model can be used to generate an extended-reality version of the video based on the feature vector and user preferences. The embodiments described with reference to FIGS. 5 and 6 are used to generate an extended-reality version of the video. In some embodiments, a machine learning model is used to generate a priority sequence, based on a feature vector, for providing the extended-reality version of the video to at least one of the user devices.

System 500 can analyze system performance and then generate additional simulations based on the system performance to simulate the processes described herein any number of times. System 500 can remove, add, or modify actions based on, for example, system performance, user input, predicted events, outcomes, or the like. System 500 can generate an XR environment (e.g., an augmented reality (AR) environment or other environment) with displayed event information (e.g., mappings of moving objects), instrument data (e.g., instrument instructions, operational parameters, etc.), sensor data, user data (e.g., real-time behavior), and other information for assisting the user.

System 500 can include an AR device (e.g., wearable device 504) that provides virtual reality (VR) simulations for monitoring of behavior, activities, or other changing information. VR is a simulated experience that employs pose tracking and 3D near-eye displays to give the user an immersive feel of a virtual world. In some embodiments, system 500 generates an XR simulation environment that includes a digital environment model. The digital model is viewable by at least one user using an AR device, such as the devices illustrated and described in more detail with reference to FIGS. 5-6. The XR simulation environment is configured to enable the at least one user to virtually perform one or more steps on the digital model. For example, the user can identify behavior, activities, or other changing information when viewing a digital twin or a virtual model of the environment.

A different XR platform is used, and a different XR simulation environment is generated for different environment types, e.g., business, home, or airport. A different XR platform is used for each of the above because each platform has different modeling parameters. The modeling parameters can be retrieved from a modeling parameter library for generating a digital model.

Different ML models are used and trained differently for each XR simulation environment generated. For example, an ML model for a mall is trained using training data describing shopper activity, security personnel, movement of goods, traffic, etc. Different XR platforms are used because the error margins between features are different for different environment types. The granularity of features is different in different environments. Therefore, different VR modeling is performed for each environment type, and different software packages are designed.

VR training can also include identifying features (e.g., people or vehicles), equipment, vehicle positions, and other data to assist in monitoring of behavior, activities, or other changing information. User input (e.g., labels, position notes, or the like) can be collected (e.g., voice, keyboard, XR device input, etc.) during the simulations and then used to modify planned procedures, provide annotation during procedures using XR environments, or the like.

In some embodiments, system 500 receives feature mapping information from the at least one user via the XR device (e.g., VR device, AR device, etc.). In some embodiments, the same XR device is used to perform VR simulations to input mapping information and perform AR-assisted monitoring on the environment based on the mapping information. In other embodiments, different XR devices are used for training and performing the monitoring of behavior, activities, or other changing information. In some training procedures, multiple users input mapping information, which is aggregated to determine what information is correct. The aggregation can be used to determine confidence scoring for XR mapping. For example, a confidence score for AR mapping is based on a threshold percentage (e.g., at least 80%, 90%, 95%, or 99%) of the users providing the same mapping (e.g., mapping input using an XR environment).

In response to the confidence score reaching a threshold level for features associated with an environment, the mapping can be deployed for performing monitoring of behavior, activities, or other changing information. In AR/VR-assisted monitoring, wearable device 504 can display information to assist the user. The displayed information can include environmental information (e.g., instrument information, movement in a vicinity, or potential adverse events), and other information to assist the user. The user can move, add, or eliminate displayed information to enhance the experience. The configuration of the wearable device 504, information displayed, and feedback provided to the user can be selected based on procedures to be performed.

In some embodiments, system 500 performs confidence-score AR mapping to meet a confidence threshold for an environment. The confidence-score AR mapping includes selecting at least a portion of the mapping information for the AR mapping to the environment. The selected mapping information is mapped to the environmental features. Via the AR device, an AR environment is displayed to the at least one user. The AR environment includes the mapping of the selected mapping information to the features.

In some embodiments, the confidence threshold (e.g., 90%, 95%, or 99%) is selected based on an environmental type. Image/video data of the environment is segmented to identify digital features associated with the environment. For example, identification is performed using the ML system 900 of FIG. 9. The digital features are part of the digital environment model. Via a VR device, one or more identification prompts are generated for receiving the environmental mapping information from the at least one user to label one or more discrete features viewed by the user. The discrete features associated with the environment can be identified using one or more ML algorithms.

The AR environment includes the mapping of the selected environmental mapping information to the environmental features. In some embodiments, the computer system maps at least some of the features of the environment using an ML platform. The ML platform includes a plurality of environment-type-specific ML modules to be applied to the image/video data of the environment to provide the environmental mapping. The environment-type-specific ML modules can be trained using environment-type grouped data sets, including environment-type mappings. Environment-type mappings can include layers based on the environment type. For example, a mall mapping can include layers showing features such as people, baggage, and vehicles. A home mapping can include layers showing landscaping, patios, walls, etc. The user can select layers, data sets, and mapping information to be added or removed from the environment-type data. For example, each platform includes a different feature extraction module, a different ML model, and different training methods.

System 500 includes a server (or other computer system 502), where such system 502 includes one or more non-transitory storage media storing program instructions to perform one or more operations of a projection module 522, a display module 523, or a feedback module 524. In some embodiments, system 500 includes wearable device 504, where the wearable device 504 may include one or more non-transitory storage media storing program instructions to perform one or more operations of the projection module 522, the display module 523, or the feedback module 524. Likewise, embodiments of system 500 can include different and/or additional components or can be connected in different ways.

Wearable device 504 can be a VR headset, such as a head-mounted device that provides VR for the wearer. Wearable device 504 can be used in applications, including simulators and trainers for monitoring of behavior, activities, or other changing information. Wearable device 504 typically includes a stereoscopic display (providing separate images for each eye), stereo sound, and sensors like accelerometers and gyroscopes for tracking the pose of the user's head to match the orientation of the virtual camera with the user's eye positions in the real world. The user can be a security professional or a user laying an AR game. Wearable device 504 can also have eye-tracking sensors and controllers. Wearable device 504 can use head-tracking, which changes the field of vision as a user turns their head.

Wearable device 504 can include imagers, sensors, displays, feedback devices, controllers, or the like. The wearable device 504 can capture data, locally analyze data, and provide output to the user based on the data. A controller of the wearable device 504 can perform local computing (e.g., edge computing) with or without communicating with a remote server and can store edge computing ML libraries locally analyzing data to provide output. This allows onboard processing to be performed to avoid or limit the impact of, for example, network communications. Edge computing is a distributed computing paradigm that brings computation and data storage closer to the sources of data. This improves response times and saves bandwidth. Edge computing is an emerging computing paradigm which refers to a range of networks and devices at or near the user. Edge computing processes video data closer to the electronic devices, enabling processing at greater speeds and volumes, leading to greater action-led results in real time.

System 500 can include one or more wearable devices configured to be worn on other parts of the body. The wearable devices can include, for example, gloves (e.g., haptic feedback gloves or motion-tracking gloves), wearable glasses, loops, heart monitors, heart rate monitors, or the like. These wearable devices can communicate with components of the system 500 via wire connections, optical connections, wireless communications, etc. The wearable device 504 can also communicate with external sensors and equipment. The wearable device 504 can receive data (sensor output, equipment output, operational information for instruments, etc.) and display the received information to the user. This allows the user to view sensor data without turning their attention away from a monitoring site.

System 500 can include a set of external displays 505 (e.g., accessories of the wearable device 504, desktop monitors, television screens, or other external displays), where the set of external displays 505 may be provided instructions to display visual stimuli based on measurements or instructions provided by the wearable device 504 or the server 502. In some embodiments, the wearable device 504 may communicate with various other electronic devices via a network 550, where the network 550 may include the Internet, a local area network, a peer-to-peer network, etc.

The wearable device 504 may send and receive messages through the network 550 to communicate with a server 502, where the server 502 may include one or more non-transitory storage media storing program instructions to perform one or more operations of a statistical predictor 525. It should further be noted that while one or more operations are described herein as being performed by particular components of the system 500, those operations may be performed by other components of the system 500 in some embodiments. For example, operations described in this disclosure as being performed by the server 502 may instead be performed by the wearable device 504, where program code or data stored on the server 502 may be stored on the wearable device 504 or another client computer device instead. Similarly, in some embodiments, the server 502 may store program code or perform operations described as being performed by the wearable device 504. For example, the server may perform operations described as being performed by the projection module 522, the display module 523, or the feedback module 524. Furthermore, although some embodiments are described herein with respect to ML models, other prediction models (e.g., a statistical model) may be used instead of or in addition to ML models. For example, a statistical model may be used to replace a neural network model in one or more embodiments.

In some embodiments, the system 500 may present a set of stimuli (e.g., shapes, text, video, or images) on a display of the wearable device 504. The wearable device 504 may include a case 543, a left transparent display 541, and a right transparent display 542, where light may be projected from emitters of the wearable device through waveguides of the transparent displays 541-542 to present stimuli viewable by an eye(s) of a user wearing the wearable device 504. The wearable device 504 also includes a set of outward-facing sensors 547, where the set of outward-facing sensors 547 may provide sensor data indicating the physical space around the wearable device 504. In some embodiments, the set of outward-facing sensors 547 may include cameras, infrared sensors, lidar sensors, radar sensors, etc. In some embodiments, the sensors 547 can be inward-facing to monitor the user's state (e.g., level of stress, alertness level, etc.).

In some embodiments, the sensors 547 can be cameras that capture images of the environment, people, equipment, user, or the like. The captured images can be used to analyze steps being performed, the environment state, and/or the surrounding environment. This allows the system 500 to provide comprehensive analytics during procedures. For example, output from the sensors 547 of the wearable device 504 can be used to analyze the concentration/focus level of the user, alertness of the user, and stress level of the user (e.g., stress level calculated based on user metrics, such as heart rate, blood pressure, or breathing pattern), and other metrics. In some embodiments, if the user becomes unable to maintain a threshold level of focus, the system 500 can modify the processes described herein such that critical steps are performed by another user, a robotic system, or using alternative techniques.

In some embodiments, sensors 547 can track the wearer's eyes and provide feedback to the user to encourage the user to focus on targeted regions for visualization. This can help train the user to focus attention on regions or areas for actions or monitoring of behavior, activities, or other changing information. The wearable device 504 can receive and store plans, data, and other information sufficient to allow one or more security steps to be performed with or without remote communications. This ensures that security steps can be completed if there is communication failure at the environment.

In some procedures, the system 500 can develop one or more training simulations for a user. The user can perform the simulations for manual procedures, robotically assisted processes, or robotic processes (e.g., moving a camera or audio equipment). The system 500 can adaptively update the simulations based on desired procedure criteria, such as process time, predicted outcome, safety, outcome scores, or the like. This allows the system 500 to develop security plans suitable for the security procedures while training the user. In some embodiments, the wearable device 504 can collect user input to synchronize the user's input with a security procedure. For example, the system 500 can develop security plans with security steps for appropriate time periods based on threshold metrics. If the user becomes fatigued or tired, security steps can be shortened, reduced, or assigned to other users. Other users can use other wearable devices that are synchronized to communicate with the wearable device 504 to provide coordinated operation between users.

In some embodiments, system 500 receives an environment type. A digital environmental model is generated based on the environment type. The digital environmental model includes environmental information associated with a portion of the environmental features. For example, system 500 retrieves modeling parameters for generating the digital environmental model based on one or more security steps. The digital environmental model is generated according to the modeling parameters. The modeling parameters can include, for example, one or more parametric modeling parameters, model properties (e.g., thermal properties), fluid modeling parameters, mesh parameters (e.g., parameters for generating 3D meshes), kinematic parameters, boundary conditions, loading parameters, biomechanical parameters, fluid dynamic parameters, thermodynamic parameters, etc. The environmental features are identified within the digital environmental model. Environmental characteristics are assigned to the identified environmental features for viewing by the at least one user. The environmental characteristics can include, for example, one or more environmental feature statuses (e.g., crowded, sparse, high traffic), area properties, sizes of environmental features, etc.

In some embodiments, system 500 retrieves modeling parameters for generating the environmental model based on one or more security steps. The digital model is generated according to the modeling parameters. The environmental features are identified within the digital model. Environmental characteristics are assigned to the identified environmental features for viewing by the at least one user. For example, the modeling parameters define three-dimensional (3D) objects in an XR or AR environment that can be moved with a number of degrees of freedom (e.g., six degrees of freedom) using a controller (e.g., cursor). Modeling the identified features enables a user to experiment with perspective compared to traditional software.

The XR simulation environment can include polygonal modeling, e.g., connecting points in 3D space (vertices) by line segments to form a polygonal mesh. For example, the XR simulation environment includes textured polygonal meshes that are flexible and/or planar to approximate curved surfaces. In some embodiments, curve modeling (defining surfaces by curves that are influenced by weighted control points) is used. For example, performing security steps virtually on the digital model uses digital sculpting (also known as sculpt modeling or 3D sculpting) to cut, push, pull, smooth, grab, pinch or otherwise manipulate virtual features.

Generating the digital model is performed by developing a mathematical coordinate-based representation of different surfaces of the features in three dimensions by manipulating edges, vertices, and polygons in the simulated XR environment. The digital model represents the physical environment using a collection of points in 3D space, connected by different geometric entities such as lines and curved surfaces, etc. In embodiments, the digital model can be created by procedural modeling or scanning based on imaging methods. The digital model can also be represented as a 2D image using 3D rendering.

The AR mapping to the environment can include solid models that define a volume of the environmental feature they represent, mapped using constructive solid geometry. One or more correlations are determined between the environmental mapping information and at least one security state, e.g., at an oil and gas facility. A confidence-score AR mapping engine is updated based on the determination. The confidence-score AR mapping engine is configured to perform confidence-score AR mapping for other scenarios in new AR environments.

The environmental mapping information can include shells or boundaries that represent surfaces of the environmental features. The AR environment displayed to the at least one user can include polygonal meshes representing the physical features, subdivision surfaces, or level sets for deforming surfaces that can undergo topological changes. The AR mapping process can include transforming digital representations of the features into polygonal representations (polygon-based rendering) of the features overlaid on images of the physical features.

Furthermore, the system 500 may present stimuli on the set of external displays 505 during a visual testing operation. While the set of external displays 505 is shown with two external displays, a set of external displays may include more or fewer external displays, such as only one external display or more than two external displays. For example, a set of external displays may include four external displays, eight external displays, nine external displays, or some other number of external displays. The external displays may include one or more types of electronic displays, such as computer monitors, smartphones, television screens, laptop devices, tablet devices, LED devices, LCD devices, and other types of electronic displays, etc. In some embodiments, the external display may include a projector, where the location of the external display may include a wall or screen onto which one or more stimuli is projected. In some embodiments, the external display may itself be transparent or partially transparent.

During or after a visual testing operation, the system 500 may obtain feedback information related to the set of stimuli, where the feedback information may indicate whether or how an eye responds to one or more stimuli of the set of stimuli. For example, some embodiments may use the wearable device 504 to collect feedback information that includes various eye-related characteristics. In some embodiments, the feedback information may include an indication of a response of an eye to the presentation of a dynamic stimulus at a first display location 546 on a wearable device 504. Alternatively, or in addition, the feedback information may include an indication of a lack of a response to such a stimulus. The response or lack of response may be determined based on one or more eye-related characteristics, such as an eye movement, a gaze direction, a distance in which an eye's gaze traveled in the gaze direction, a pupil size change, a user-specific input, etc. In some embodiments, the feedback information may include image data or results based on image data. For example, some embodiments may obtain an image or sequence of images (e.g., in the form of a video) of an eye captured during a testing operation as the eye responds to a stimulus.

In some embodiments, the system 500 may track the ocular data of an eye and update associated ocular information based on feedback information indicating eye responses to stimuli. Some embodiments may use a prediction model to detect a non-responsive region of a visual field or another ocular issue of a visual field portion associated with the ocular data. In some embodiments, satisfying a set of vision criteria for a visual field location may include determining whether an eye responded to a stimulus presented at the display location mapped to the visual field location, where different presented stimuli may vary in brightness, color, shape, size, etc.

In some embodiments, the system 500 can adjust viewing by the user based on the ocular information collected by the wearable device 504. Any number of simulations can be performed to generate ocular information suitable for determining optimal settings for a user. The settings can change throughout a security procedure based on security steps. For example, if the user becomes tired or fatigued, the system 500 can adjust the visual field to stimulate the user, thereby increasing attentiveness, e.g., in a war zone or combat scenario. In some embodiments, the user can adjust the stimuli to his or her preferred preferences. Other responses can be collected and associated with the security procedure, specific security steps, or the like. Feedback scores can be generated to rank the collected set of stimuli. The score can be based on the time to complete action, biometric levels of the user (e.g., state of stress or heart rate), or other metrics.

In some embodiments, data used or updated by one or more operations described in this disclosure may be stored in a set of databases 530. In some embodiments, the server 502, the wearable device 504, the set of external displays 505, or other computer devices may access the set of databases to perform one or more operations described in this disclosure. For example, a prediction model used to determine ocular information may be obtained from a first database 531, where the first database 531 may be used to store prediction models or parameters of prediction models. Alternatively, or in addition, the set of databases 530 may store feedback information collected by the wearable device 504 or results determined from the feedback information. For example, a second database 532 may be used to store a set of user profiles that include or link to feedback information corresponding with eye measurement data for the users identified by the set of user profiles. Alternatively, or in addition, the set of databases 530 may store instructions indicating different types of testing procedures. For example, a third database 533 may store a set of testing instructions that causes a first stimulus to be presented on the wearable device 504, then causes a second stimulus to be presented on a first external display 505a, and thereafter causes a third stimulus to be presented on a second external display 505b.

In some embodiments, the projection module 522 may generate a field-to-display map that maps a position or region of a visual field with a position or region of the set of external displays 505 or of an AR interface displayed on the left transparent display 541 or the right transparent display 542. The field-to-display map may be stored in various forms, such as in the form of a set of multi-dimensional arrays, a function, a subroutine, etc. For example, the field-to-display map may include a first multi-dimensional array, where the first two dimensions of the first array may indicate a coordinate in a combined display space that maps 1:1 with a visual field. In some embodiments, a third dimension of the first array may identify which external display or wearable display to use when presenting a stimulus. Furthermore, a fourth and fifth dimension of the array may be used as coordinates relative to the origin of each respective external display. In some embodiments, an array or other set of numbers described in this disclosure may instead be divided into a plurality of arrays or other subsets of numbers. In some embodiments, the field-to-display map may be used in reverse, such that a display location may be mapped to a visual field location ("field location") using the field-to-display map. Some embodiments pre-generate a display-to-field map by inverting one or more of the arrays described above. Furthermore, some embodiments may use or update a map by using an array or other data structure of the map. Various other embodiments of the field-to-display map are possible, as described elsewhere in this disclosure.

In some embodiments, the projection module 522 may obtain sensor information from the set of outward-facing sensors 547, where the sensor information may include position measurements of the set of external displays 505. For example, a user wearing the wearable device 504 may rotate or translate their head, which may cause a corresponding rotation or translation of the wearable device 504. Some embodiments may detect these changes in the physical orientation or position of the wearable device 504 with respect to the set of external displays 505. Some embodiments may then perform a mapping operation to determine the positions and orientations of the set of external displays based on the sensor information collected by the set of outward-facing sensors 547.

In some embodiments, the projection module 522 may update a field-to-display map that stores or otherwise indicates associations between field locations of a visual field and display locations of the left transparent display 541, the right transparent display 542, or the set of external displays 505. For example, the set of outward-facing sensors 547 may include one or more cameras to collect visual information from a surrounding area of the wearable device 504, where the visual information may be used to determine a position or orientation of one or more devices of the set of external displays 505. As the wearable device 504 is moved, some embodiments may continuously obtain sensor information indicating changes to the external environment, including changes in the position or orientation of the set of external displays 505 relative to the position or orientation of the wearable device 504. For example, some embodiments may generate a point cloud representing the surfaces of objects around the wearable device 504 and determine the positions and orientations of the set of external displays 505 relative to the wearable device 504 based on the point cloud. Furthermore, some embodiments may continuously update the field-to-display map as new sensor information is collected by the set of outward-facing sensors 547.

In some embodiments, the display module 523 may present a set of stimuli on the wearable device 504 or the set of external displays 505. In some embodiments, the left transparent display 541 and right transparent display 542 may be positioned with respect to the case 543 to fit an orbital area on a user such that each display of the transparent displays 541-542 is able to collect data and present stimuli or other images to the user. The left transparent display 541 and right transparent display 542 may contain or be associated with an electronic display configured to present re-created images to an eye viewing the respective transparent display. In various embodiments, electronic display may include a projector, display screen, and/or hardware to present an image viewable by the eye. In some embodiments, a projector of an electronic monitor may be positioned to project images onto an eye of the subject or onto or through a screen, glass, waveguide, or other material. For example, the display module 523 may cause a fixation point or another visual stimulus to be projected onto the first display location 546, where the fixation point at the first display location 546 may then be viewed by an eye of a user wearing the wearable device 504.

In some embodiments, the display module 523 may cause a set of stimuli to be displayed onto electronic displays other than the displays of the other external displays, such as an external display of the set of the external displays 505. For example, after presenting a stimulus on a display of the wearable device 504, the display module 523 may cause a stimulus to be presented on the second external display 505b at a second display location 551. As used in this disclosure, an external display location may include a display location on an external display. The display module 523 may then proceed to display additional stimuli on an additional location of the first external display 505a, the wearable device 504, or the second external display 505b.

Some embodiments may determine the display location for a stimulus by first determining the location or region of a visual field. After determining the location or region of the visual field, some embodiments may then use a field-to-display map to determine which display location of the left transparent display 541, the right transparent display 542, or the set of external displays 505 to use when displaying a stimulus. For example, some embodiments may determine that a previous sequence of sensor measurements indicated that a first region of a visual field has not yet been tested and select this first region for testing. Some embodiments may then use the field-to-display map to determine a third display location 552 on the first external display 505a and, in response to selecting the third display location 552, display a stimulus at the third display location 552. As described elsewhere in this disclosure, some embodiments may measure eye movements or otherwise measure responses of an eye to the stimuli presented on the set of external displays 505 to measure a visual field of the eye. Furthermore, as described in this disclosure, a visual field location of a stimulus may include the field location mapped to or otherwise associated with the display location of the stimulus, where the mapping or association between the display and the field location is determined by a field-to-display map. Similarly, as used in this disclosure, a gaze location that is located at a field location may also be described as being located at a display location mapped to the field location.

In some embodiments, the feedback module 524 may record feedback information indicating eye responses to the set of stimuli presented on the wearable device 504 or the set of external displays 505. In some embodiments, the transparent displays 541-542 may include a left inward-directed sensor 544 and a right inward-directed sensor 545, where the inward-directed sensors 544-545 may include eye-tracking sensors. The inward-directed sensors 544-545 may include cameras, infrared cameras, photodetectors, infrared sensors, etc. For example, the inward-directed sensors 544-545 may include cameras configured to track pupil movement and determine and track the visual axes of the subject. In some embodiments, the inward-directed sensors 544-545 may include infrared cameras and be positioned in lower portions relative to the transparent displays 541-542. The inward-directed sensors 544-545 may be directionally aligned to point toward a presumed pupil region for line-of-sight tracking or pupil tracking.

In some embodiments, the feedback module 524 may use the inward-directed sensors 544-545 to collect feedback information indicating eye motion as an eye responds to different stimuli. For example, the feedback module 524 may retrieve feedback information of an eye collected by the inward-directed sensors 544-545 as the eye responds to the presentation of a stimulus at the first display location 546 and the second display location 551. By collecting feedback information while stimuli are presented on both the wearable device 504 and one or more devices of the set of external displays 505, some embodiments may increase the boundaries of a visual field for which ocular data may be detected.

In some embodiments, the statistical predictor 525 may retrieve stimuli information, such as stimuli locations and characteristics of the stimuli locations, where the stimuli locations may include locations on the set of external displays 505. The statistical predictor 525 may also retrieve training outputs indicative of the presence or absence of ocular responses or other outputs of a prediction model. The statistical predictor 525 may then provide the set of stimuli information and training outputs to a ML model to update the parameters of the ML model to predict ocular responses based on new inputs. An example ML system 900 is illustrated and described in more detail with reference to FIG. 9. Alternatively, or in addition, the statistical predictor 525 may use statistical models or rules to determine ocular responses and generate a visual field map representing a visual field of an eye, where one or more regions of the visual field map may be associated with a set of ocular responses or otherwise include ocular response information.

FIG. 6 is a drawing illustrating an example XR HMD 601, in accordance with one or more embodiments. HMD 601 can be, for example, an augmented reality device worn by a user while the user views a particular environment. Information can be displayed at selected locations to avoid obstructing the viewing of targeted areas. A user 695 (e.g., video gamer or security professional) can wear HMD 601, which can include a computing device 607. Computing device 607 can include a processor, microprocessor, controller, or other circuitry. In some embodiments, an eye 696 of the user may be capable of viewing images and video in XR from the operating room 602 through lenses 670 of the HMD 601. The HMD 601 may include an interior-facing camera to capture eye-related information and a set of exterior-facing cameras that include an exterior-facing camera 682. Likewise, embodiments of HMD 601 can include different and/or additional components or can be connected in different ways.

In some embodiments, a user initiates an XR session using computing system 680 that is in communication with the HMD 601. Computing system 680 may include a stand-alone computer capable of operating without connecting to another computing device outside of a local network. Alternatively, or in addition, the computing system 680 may include a computing system that receives program instructions or required data from an external data source not available through a local network.

In some embodiments, the computing system 680 may initiate an XR session. Computing system 680 may communicate with the HMD 601 via a wireless connection or wired connection. For example, the computing system 680 may send a wireless message to the computing device 607 to initiate an XR session. For example, the computing system 680 may send a command to the HMD 601 via a Bluetooth® connection, where the command may cause the HMD 601 to activate.

In some embodiments, the computing system 680 may communicate with the HMD 601 to perform one or more operations. For example, the HMD 601 may present an initial set of instructions to user 695 and request a response from user 695. After user 695 provides a requested response (e.g., pressing a button, making a statement, etc.), the computing system 680 may send a first set of instructions to the HMD 601 to calibrate readings to more accurately measure eye-related data associated with the eye 696. After the HMD 601 sends a message to the computing system 680 that calibration operations have been completed, the computing system 680 may send further instructions to the HMD 601. The computing system 680 may determine the position of a fixation point based on eye-related readings and send a message to the HMD 601 that causes the HMD 601 to display a visual stimulus at the fixation point on the lenses 670. After receiving a message from the HMD 601 that the eye 696 has set its gaze at the fixation point, the computing system 680 may continue the XR session.

In some embodiments, an application executed by the computing device 607 of the HMD 601 may be used to control operations of components of the HMD 601 or other electronic components. For example, the application executed by computing device 607 may begin a visual test program and send a wireless message to a circuitry of the computing system 680 using a wireless headset communication subsystem 603. The wireless message may be based on one of various types of communication standards, such as a Bluetooth® standard, a Wi-Fi Direct standard, a NFC standard, a ZigBee® standard, a 6LoWPAN standard, etc.

In some embodiments, an application being executed by the computing device 607 may retrieve data from the interior-facing camera 683 and send instructions to control equipment based on this data. For example, the computing device 607 may execute an application to perform a Viola-Jones object detection framework to detect an eye in a set of images using a boosted feature classifier based on video data provided by the interior-facing camera 683. Furthermore, the application executed by the computing device 607 may permit additional sensor data to trigger equipment in a room 602, such as by receiving voice instructions captured from a microphone 681, motion detected by the exterior-facing camera 682, feeling a set of touches on the housing of the HMD 601, etc.

In some embodiments, a testing application executed by the computing device 607 detects that a gaze location of user 695 is focused on a target user interface (UI) element or a target direction based on data collected by interior-facing camera 683. For example, HMD 601 displays a set of instructions that causes user 695 to look at a target UI location. In some embodiments, the target UI location is represented by a target region associated with the target UI location, such that a gaze location determined to be within the target region is considered to be focused on the target UI location. In response to a determination that the gaze location of eye 696 is focused on the target UI location based on images provided by the interior-facing camera 683, the application can activate equipment 632. Furthermore, the application can send a message to a robotic system 611 to turn off equipment 632 based on a determination that the target UI location is no longer a focus of the user's gaze. Alternatively, some embodiments may forego waiting for user 695 to focus on a particular UI location or a particular direction before activating the equipment 632.

In additional embodiments, a computer system obtains environmental data, e.g., from camera 105 of FIG. 1. An AR mapping platform is trained based on the obtained data (audio, images, video, etc.). For example, the AR mapping platform is configured to receive user input for the identification of environmental features/objects. One or more environmental features are identified based on the obtained data. The computer system performs AR mapping of the identified one or more features using the trained AR mapping platform. Via an AR device, the AR mapping is displayed to be viewed by a user.

In some embodiments, performing the AR mapping includes determining one or more features to be identified. The one or more features are identified. The one or more features and associated information are labeled. For example, one or more unidentifiable features are marked. In some embodiments, an autonomous mapping platform is used to perform the AR mapping. The autonomous mapping platform is trained by multiple users inputting data for reference images and validated for autonomously mapping a set of features associated with an environment.

In some embodiments, a computer system selects one or more candidate features of a virtual environmental model in a VR environment displayed to a user. For example, the candidate features can be edges, points, or object parts. User input is received for the selected one or more candidate features. The computer system determines whether the user input for one or more candidate features reaches a threshold confidence score. In response to the user input reaching the threshold confidence score, the user input is identified as accurately labeling the one or more candidate features. In some embodiments, a computer system stores the user input as reference label data for the corresponding one or more candidate features. For example, the user input includes a label for each one of the respective one or more candidate features.

In some embodiments, determining whether the user input for one or more candidate features reaches the threshold confidence score is based on a comparison reference user input for similar candidate features. For example, the user input is used to train an ML model. Example machine learning and artificial intelligence techniques for implementing notification priority sequencing for video security are illustrated and described in more detail with reference to FIG. 9. For each of the candidate features, the user input can include at least one of a name of the candidate feature or user annotation.

Figure 7:
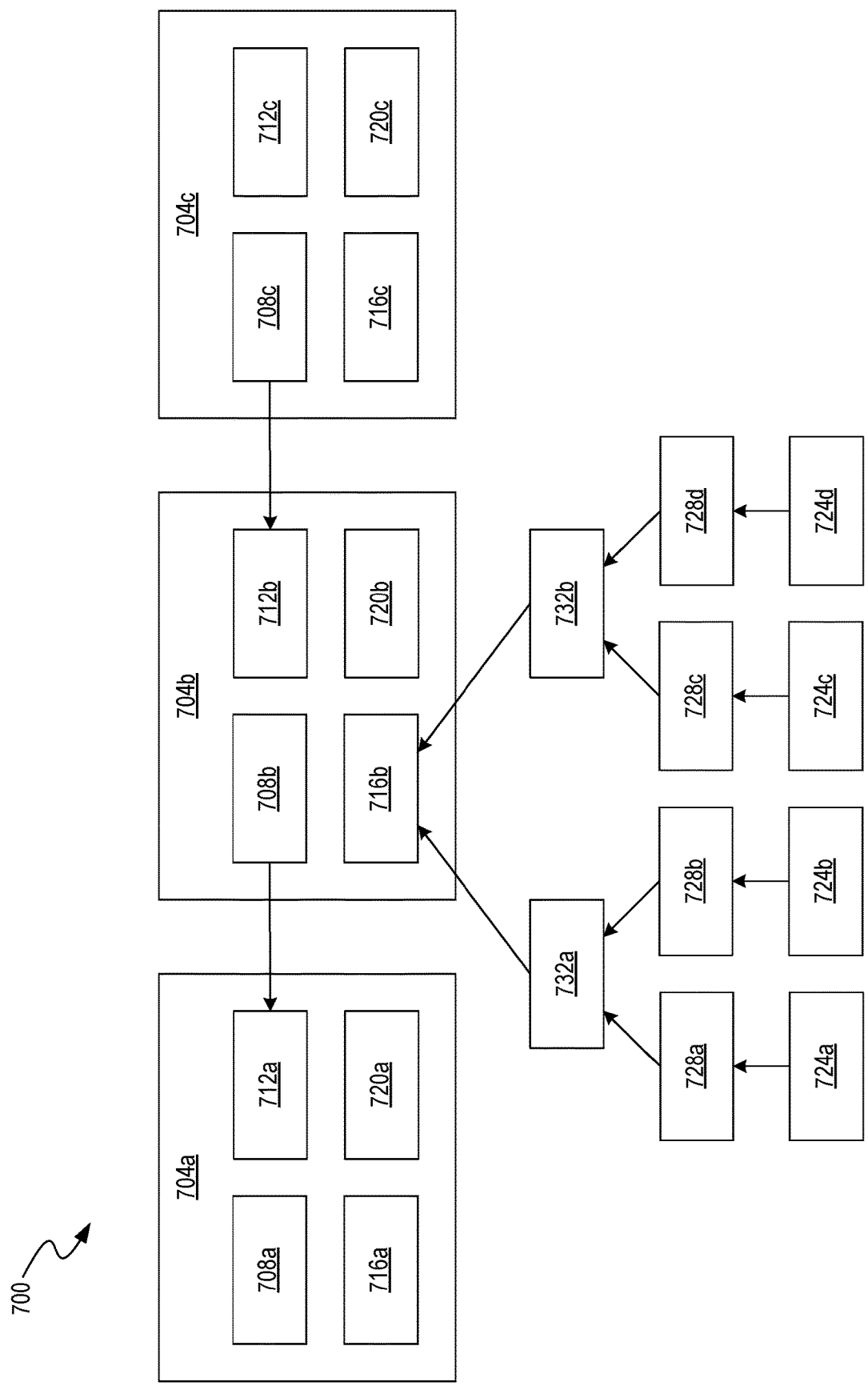
FIG. 7 is a block diagram illustrating components of at least a portion of an exemplary blockchain system, in accordance with one or more embodiments of this disclosure.

FIG. 7 is a block diagram illustrating components of at least a portion of an example blockchain system 700, in accordance with one or more embodiments of this disclosure. Blockchain system 700 includes blockchain 704. In embodiments, the blockchain 704 is a distributed ledger of transactions (e.g., a continuously growing list of records, such as records of transactions for digital assets such as cryptocurrency, bitcoin, or electronic cash) that is maintained by a blockchain system 700. For example, the blockchain 704 is stored redundantly at multiple nodes (e.g., computers) of a blockchain network. Each node in the blockchain network can store a complete replica of the entirety of blockchain 704. In some embodiments, the blockchain system 700 implements storage of an identical blockchain at each node, even when nodes receive transactions in different orderings. The blockchain 704 shown by FIG. 7 includes blocks such as block 704a, block 704b, and/or block 704c. Likewise, embodiments of the blockchain system 700 can include different and/or additional components or be connected in different ways.

The terms "blockchain" and "chain" are used interchangeably herein. In embodiments, the blockchain 704 is a distributed database that is shared among the nodes of a computer network. As a database, the blockchain 704 stores information electronically in a digital format. The blockchain 704 can maintain a secure and decentralized record of transactions (e.g., transactions such as transaction 724a and/or transaction 724b). For example, the ERC-721 or ERC-1155 standards are used for maintaining a secure and decentralized record of transactions. The blockchain 704 provides fidelity and security for the data record. In embodiments, blockchain 704 collects information together in groups, known as "blocks" (e.g., blocks such as block 704a, block 704b, and/or block 704c) that hold sets of information.

The blockchain 704 structures its data into chunks (blocks) (e.g., blocks such as block 704a, block 704b, and/or block 704c) that are strung together. Blocks (e.g., block 704c) have certain storage capacities and, when filled, are closed and linked to a previously filled block (e.g., block 704b), forming a chain of data known as the "blockchain." New information that follows a freshly added block (e.g., block 704b) is compiled into a newly formed block (e.g., block 704c) that will then also be added to the blockchain 704 once filled. The data structure inherently makes an irreversible timeline of data when implemented in a decentralized nature. When a block is filled, it becomes a part of this timeline of blocks. Each block (e.g., block 704a) in the blockchain system 700 is given an exact timestamp (e.g., timestamp 712a) when it is added to the blockchain system 700. In the example of FIG. 7, blockchain system 700 includes multiple blocks. Each of the blocks (e.g., block 704a, block 704b, block 704c) can represent one or multiple transactions and can include a cryptographic hash of the previous block (e.g., previous hashes 708a-c), a timestamp (e.g., timestamps 712a-c), a transactions root hash (e.g., 716a-c), and a nonce (e.g., 720a-c). A transactions root hash (e.g., transactions root hash 716b) indicates the proof that the block 704b contains all the transactions in the proper order. Transactions root hash 716b proves the integrity of transactions in the block 704b without presenting all transactions.

In embodiments, the timestamp 712a-c of each of corresponding blocks of block 704a, block 704b, block 704c includes data indicating a time associated with the block. In some examples, the timestamp includes a sequence of characters that uniquely identifies a given point in time. In one example, the timestamp of a block includes the previous timestamp in its hash and enables the sequence of block generation to be verified.

In embodiments, nonces 720a-c of each of corresponding blocks of block 704a, block 704b, block 704c include any generated random or semi-random number. The nonce can be used by miners during proof of work (PoW), which refers to a form of adding new blocks of transactions to blockchain 704. The work refers to generating a hash that matches the target hash for the current block. For example, a nonce is an arbitrary number that miners (e.g., devices that validate blocks) can change in order to modify a header hash and produce a hash that is less than or equal to the target hash value set by the network.

As described above, each of blocks of block 704a, block 704b, block 704c of blockchain 704 can include respective block hash, e.g., transactions root hash 716a, transactions root hash 716b, and transactions root hash 716c. Each of block hashes 716a-c can represent a hash of a root node of a Merkle tree for the contents of the block (e.g., the transactions of the corresponding block). For example, the Merkle tree contains leaf nodes corresponding to hashes of components of the transaction, such as a reference that identifies an output of a prior transaction that is input to the transaction, an attachment, and a command. Each non-leaf node can contain a hash of the hashes of its child nodes. The Merkle tree can also be considered to have each component as the leaf node with its parent node corresponding to the hash of the component.

In the example of FIG. 7, block 704b records transactions 724a-d. Each of the leaf nodes 728a-d contain a hash corresponding to transactions 724a-d respectively. As described above, a hash (e.g., the hash in leaf node such as node 728a) can be a hash of components of a transaction (e.g., transaction 724a), for example, a reference that identifies an output of a prior transaction that is input to the transaction 724a, an attachment, and a command. Each of the non-leaf nodes of node 732a and node 732b can contain a hash of the hashes of its child nodes (e.g., leaf nodes such as node 728a and node 728b). In this example, node 732a can contain a hash of the hashes contained in node 728a, node 728b and node 732b can contain a hash of the hashes contained in node 728c, node 728d. The root node, which includes (e.g., contains) transactions root hash 716b, can contain a hash of the hashes of child nodes 732a-b.

A Merkle tree representation of a transaction (e.g., transaction 724a) allows an entity needing access to the transaction 724a to be provided with only a portion that includes the components that the entity needs. For example, if an entity needs only the transaction summary, the entity can be provided with the nodes (and each node's sibling nodes)

along the path from the root node to the node of the hash of the transaction summary. The entity can confirm that the transaction summary is that used in the transaction 724a by generating a hash of the transaction summary and calculating the hashes of the nodes along the path to the root node. If the calculated hash of the root node matches the hash of node 728a of the transaction 724a, the transaction summary is confirmed as the one used in the transaction. Because only the portion of the Merkle tree relating to components that an entity needs is provided, the entity will not have access to other components. Thus, the confidentiality of the other components is not compromised.

To transfer ownership of a digital asset, such as a bitcoin, using the blockchain system 700, a new transaction, such as one of transactions 724a-d, is generated and added to a stack of transactions in a block, e.g., block 704b. To record a transaction in a blockchain, each party and asset involved with the transaction needs an account that is identified by a digital token. For example, when a first user wants to transfer an asset that the first user owns to a second user, the first and second user both create accounts, and the first user also creates an account that is uniquely identified by the asset's identification number. The account for the asset identifies the first user as being the current owner of the asset. The first user (i.e., the current owner) creates a transaction (e.g., transaction 724a) against the account for the asset that indicates that the transaction 724a is a transfer of ownership and outputs a token identifying the second user as the next owner and a token identifying the asset. The transaction 724a is signed by the private key of the first user (i.e., the current owner), and the transaction 724a is evidence that the second user is now the new current owner and that ownership has been transferred from the first to the second user.

The transaction 724a (e.g., a new transaction), which includes the public key of the new owner (e.g., a second user to whom a digital asset is assigned ownership in the transaction), is digitally signed by the first user with the first user's private key to transfer ownership to the second user (e.g., new owner), as represented by the second user public key. The signing by the owner of the bitcoin is an authorization by the owner to transfer ownership of the bitcoin to the new owner via the transaction 724a (e.g., the new transaction). Once the block is full, the block is "capped" with a block header, that is, a hash digest of all the transaction identifiers within the block. The block header is recorded as the first transaction in the next block in the chain, creating a mathematical hierarchy called the "blockchain." To verify the current owner, the blockchain 704 of transactions can be followed to verify each transaction from the first transaction to the last transaction. The new owner need only have the private key that matches the public key of the transaction that transferred the bitcoin. The blockchain creates a mathematical proof of ownership in an entity represented by a security identity (e.g., a public key), which in the case of the bitcoin system is pseudo-anonymous.

Additionally, in some embodiments, the blockchain system 700 uses one or more smart contracts to enable more complex transactions. A smart contract includes computer code implementing transactions of a contract. The computer code can be executed on a secure platform (e.g., an Ethereum platform, which provides a virtual machine) that supports recording transactions (e.g., 724a-d) in blockchains. For example, a smart contract can be a self-executing contract with the terms of the agreement between buyer and seller being directly written into lines of code. The code and the agreements contained therein exist across a distributed, decentralized blockchain network.

In addition, the smart contract can itself be recorded as a transaction 724a in the blockchain 704 using a token that is a hash of node 728a of the computer code so that the computer code that is executed can be authenticated. When deployed, a constructor of the smart contract executes, initializing the smart contract and its state. The state of a smart contract is stored persistently in the blockchain 704. When a transaction 724a is recorded against a smart contract, a message is sent to the smart contract, and the computer code of the smart contract executes to implement the transaction (e.g., debit a certain amount from the balance of an account). The computer code ensures that all the terms of the contract are complied with before the transaction 724a is recorded in the blockchain 704.

For example, a smart contract can support the sale of an asset. The inputs to a smart contract to sell an asset can be tokens identifying the seller, the buyer, the asset, and the sale price in U.S. dollars or cryptocurrency. The computer code is used to ensure that the seller is the current owner of the asset and that the buyer has sufficient funds in their account. The computer code records a transaction (e.g., transaction 724a) that transfers the ownership of the asset to the buyer and a transaction (e.g., transaction 724b) that transfers the sale price from the buyer's account to the seller's account. If the seller's account is in U.S. dollars and the buyer's account is in Canadian dollars, the computer code can retrieve a currency exchange rate, determine how many Canadian dollars the seller's account should be debited, and record the exchange rate. If either of transaction 724a or transaction 724b is not successful, neither transaction is recorded.

When a message is sent to a smart contract to record a transaction 724a, the message is sent to each node that maintains a replica of the blockchain 704. Each node executes the computer code of the smart contract to implement the transaction 724a. For example, if a hundred nodes each maintain a replica of the blockchain 704, the computer code executes at each of the hundred nodes. When a node completes execution of the computer code, the result of the transaction 724a is recorded in the blockchain 704. The nodes employ a consensus algorithm to decide which transactions (e.g., transaction 724c) to keep and which transactions (e.g., transaction 724d) to discard. Although the execution of the computer code at each node helps ensure the authenticity of the blockchain 704, large amounts of computer resources are required to support such redundant execution of computer code.

Although blockchains can effectively store transactions 724a-d, the large amount of computer resources, such as storage and computational power, needed to maintain all the replicas of the blockchain can be problematic. To overcome this problem, some systems for storing transactions 724a-d do not use blockchains, but rather have each party to a transaction maintain its own copy of the transaction 724a. One such system is the Corda™ system developed by R3™ that provides a decentralized distributed ledger platform in which each participant in the platform has a node (e.g., computer system) that maintains its portion of the distributed ledger.

When parties agree on the terms of a transaction 724a, a party submits the transaction 724a to a notary, which is a trusted node, for notarization. The notary maintains a consumed output database of transaction outputs that have been input into other transactions. When a transaction 724a is received, the notary checks the inputs to the transaction 724a against the consumed output database to ensure that the outputs that the inputs reference have not been spent. If the inputs have not been spent, the notary updates the consumed output database to indicate that the referenced outputs have been spent, notarizes the transaction 724a (e.g., by signing the transaction or a transaction identifier with a private key of the notary), and sends the notarized transaction to the party that submitted the transaction 724a for notarization. When the party receives the notarized transaction, the party stores the notarized transaction and provides the notarized transaction to the counterparties.

In embodiments, a notary is a non-validating notary or a validating notary. When a non-validating notary is to notarize a transaction (e.g., transaction 724b), the non-validating notary determines that the prior output of a prior transaction (e.g., transaction 724a), that is, the input of a current transaction, e.g., transaction 724b, has not been consumed. If the prior output has not been consumed, the non-validating notary notarizes the transaction 724b by signing a hash of node 728b of the transaction. To notarize a transaction 724b, a non-validating notary needs only the identification of the prior output (e.g., the hash of node 728a of the prior transaction (e.g., transaction 724a) and the index of the output) and the portion of the Merkle tree needed to calculate the hash of node 728b of the transaction 724b.

As described herein, in some embodiments, the blockchain system 700 uses one or more smart contracts to enable more complex transactions. For example, a validating notary validates a transaction (e.g., transaction 724d), which includes verifying that prior transactions 724a-c in a backchain of transactions are valid. The backchain refers to the collection of prior transactions (e.g., transaction 724c) of a transaction 724d, as well as prior transactions of transaction 724a, transaction 724b, and transaction 724c, and so on. To validate a transaction 724d, a validating notary invokes validation code of the transaction 724d. In one example, a validating notary invokes validation code of a smart contract of the transaction 724d. The validation code performs whatever checks are needed to comply with the terms applicable to the transaction 724d. This checking can include retrieving the public key of the owner from the prior transaction (e.g., transaction 724c) (pointed to by the input state of the transaction 724d) and checks the signature of the transaction 724d, ensuring that the prior output of a prior transaction that is input has not been consumed, and checking the validity of each transaction (e.g., transaction 724c) in the backchain of the transactions. If the validation code indicates that the transaction 724d is valid, the validating notary notarizes the transaction 724d and records the output of the prior transaction (e.g., transaction 724c) as consumed.

In some examples, to verify that the transactions 724a-d in a ledger stored at a node are correct, the blocks, e.g., block 704a, block 704b, block 704c in the blockchain 704 can be accessed from oldest block (e.g., block 704a) to newest block (e.g., block 704c), generating a new hash of the block 704c and comparing the new hash to the hash 708c generated when the block 704c was created. If the hashes are the same, then the transactions in the block are verified. In one example, the Bitcoin system also implements techniques to ensure that it would be infeasible to change a transaction 724a and regenerate the blockchain 704 by employing a computationally expensive technique to generate a nonce 720b that is added to the block when it is created. A bitcoin ledger is sometimes referred to as an Unspent Transaction Output ("UTXO") set because it tracks the output of all transactions that have not yet been spent.

In some embodiments, a self-sovereign identity (SSI) approach to digital identity is used that gives individuals control over the information they use to prove who they are to websites, services, and applications across the web. In an SSI system, the user accesses services in a streamlined and secure manner, while maintaining control over the information associated with their identity. SSI addresses the difficulty of establishing trust in an interaction. In order to be trusted, one party in an interaction will present credentials to the other parties, and those relying on parties can verify that the credentials came from an issuer that they trust. In this way, the verifier's trust in the issuer is transferred to the credential holder. This basic structure of SSI with three participants is sometimes called "the trust triangle". For an identity system to be self-sovereign, users control the verifiable credentials that they hold and their consent is required to use those credentials. This reduces the unintended sharing of users' personal data.

In an SSI system, holders generate and control unique identifiers called decentralized identifiers. Most SSI systems are decentralized, where the credentials are managed using crypto wallets and verified using public-key cryptography anchored on a distributed ledger. The credentials may contain data from an issuer's database, a social media account, a history of transactions on an e-commerce site, or attestation from friends or colleagues.

Figure 8A:
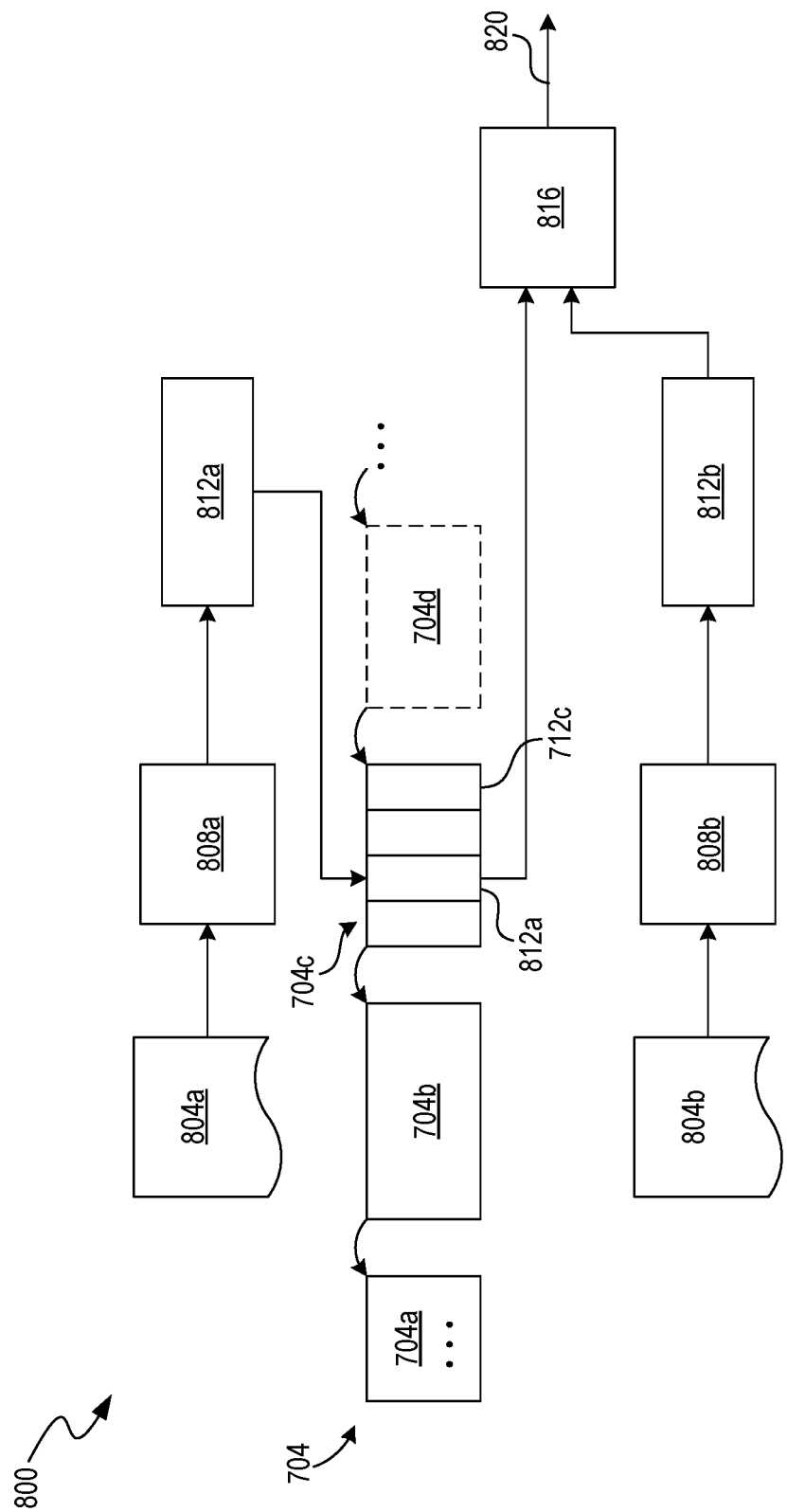
FIG. 8A is a drawing illustrating an application of a hash function, in accordance with one or more embodiments of this disclosure.

FIG. 8A is a drawing illustrating an application of a hash function, in accordance with one or more embodiments of this disclosure. The process 800 shown by FIG. 8A uses a hash algorithm to generate a token or perform a cryptographic transaction on a blockchain. An example blockchain 704, e.g., as shown in FIG. 8A, is also illustrated and described in detail with reference to FIG. 7. The process 800 can be performed by a computer system such as that described with reference to FIG. 10 and/or by nodes of the blockchain 704. Some embodiments include different and/or additional steps or perform steps in different orders.

In embodiments, a digital message, electronic art, a digital collectible, any other form of digital content, or a combination thereof (e.g., digital content 804a) can be hashed using hashing algorithm 808a. The hashing algorithm 808a (sometimes referred to as a "hash function") can be a function used to map data of arbitrary size (e.g., digital content 804a) to fixed-size values (e.g., hash of values 812a). The values 812a that are returned by the hashing algorithm 808a can be called hash values, hash codes, digests, or hashes. The values 812a can be used to index a fixed-size table called a hash table. A hash table, also known as a hash map, is a data structure that implements an associative array or dictionary, which is an abstract data type that maps keys (e.g., digital content 804a) to values 812a.

The output of the hashed digital content (e.g., hash of values 812a) can be inserted into a block (e.g., block 704c) of the blockchain 704 (e.g., comprising blocks such as block 704a, block 704b, block 704c). The block 704c can include, among other things, information such as timestamp 712c. In order to verify that the block 704c is correct, a new hash 812b is generated by applying hashing algorithm 808b to the digital content 804b. The new hash 812b is compared to the hash of values 812a in the blockchain 704 at comparison step 816. If the new hash 812b is the same as the hash of values 812a of the block 704c, the comparison yields an indication that they match. For example, the decision 820 can indicate that the hashes of values 812a-b are the same or not. The hashes can be indicated to be the same if the characters of the hash match. The hashing algorithms 808a-b can include any suitable hashing algorithm. Examples include Message Digest 5 (MD5), Secure Hashing Algorithm (SHA) and/or the likes.

Components of the process 800 can generate or validate an NFT, which is a cryptographic asset that has a unique identification code and metadata that uniquely identifies the NFT. In one example, the digital content 804*a* can be hashed and minted to generate an NFT, or the digital content 804*a* can represent an NFT that is verified using the process 800 and the digital content 804*b*. An NFT can include digital data stored in the blockchain 704. The ownership of an NFT is recorded in the blockchain 704 and transferrable by an owner, allowing the NFT to be sold and traded. The NFT contains a reference to digital files such as photos, videos, or audio (e.g., digital content 804*a*). Because NFTs are uniquely identifiable assets, they differ from cryptocurrencies, which are fungible. In particular, NFTs function like cryptographic tokens, but unlike cryptocurrencies such as Bitcoin™ or Ethereum™, NFTs are not mutually interchangeable, and so are not fungible.

The NFT can be associated with a particular digital or physical asset such as images, art, music, and sport highlights and can confer licensing rights to use the asset for a specified purpose. As with other assets, NFTs are recorded on a blockchain when a blockchain 704 concatenates records containing cryptographic hashes—sets of characters that identify a set of data—onto previous records, creating a chain of identifiable data blocks such as block 704*a*, block 704*b*, block 704*c*, and block 704*d*. A cryptographic transaction process enables authentication of each digital file by providing a digital signature that tracks NFT ownership. In embodiments, a data link that is part of the NFT records points to details about where the associated art is stored.

Minting an NFT can refer to the process of turning a digital file (e.g., digital content 804*a*) into a crypto collectible or digital asset on blockchain 704 (e.g., the Ethereum™ blockchain). The digital item or file (e.g., digital content 804*a*) can be stored in the blockchain 704 and cannot be able to be edited, modified, or deleted. The process of uploading a specific item onto the blockchain 704 is known as "minting." For example, "NFT minting" can refer to a process by which a digital art or digital content 804*a* becomes a part of the Ethereum™ blockchain. Thus, the process turns digital content 804*a* into a crypto asset, which is easily traded or bought with cryptocurrencies on a digital marketplace without an intermediary.

Figure 8B:
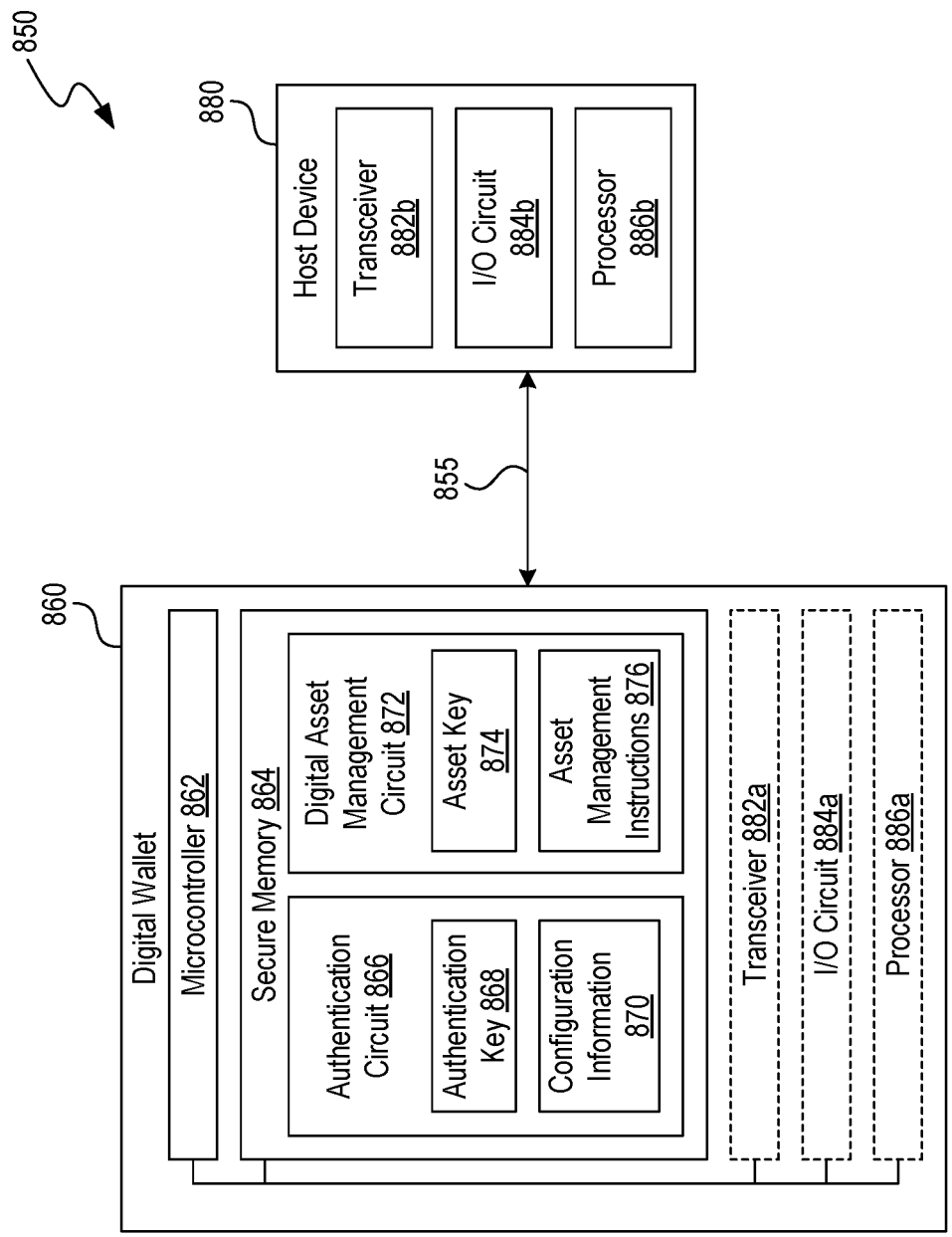
FIG. 8B is a block diagram illustrating an example cryptographic wallet, in accordance with one or more embodiments of this disclosure.

FIG. 8B is a block diagram illustrating an example environment 850 within which cryptographic wallet 860 operates, in accordance with one or more embodiments of this disclosure. As a general overview, cryptographic wallet 860 is an electronic entity that allows users to securely manage digital assets. According to various embodiments, the cryptographic wallet 860 can be a hardware-based wallet (e.g., can include dedicated hardware component(s)), a software-based wallet, or a combination thereof. Example digital assets that can be stored and managed using the cryptographic wallet 860 include digital coins, digital tokens, and/or the like. In some embodiments, tokens are stored on a blockchain system, such as the blockchain system 700 described in FIG. 7. In some embodiments, the cryptographic wallet 860 may be capable of connecting to and managing assets that are native to or associated with multiple, different blockchain systems (e.g., including multiple blockchain systems having structure similar to or equivalent to blockchain system 700).

As defined herein, the terms "coin" and "token" refer to a digital representation of a particular asset, utility, ownership interest, and/or access right. Any suitable type of coin or token can be managed using various embodiments of the cryptographic wallet 860. In some embodiments, tokens include cryptocurrency, such as exchange tokens and/or stablecoins. Exchange tokens and/or stablecoins can be native to a particular blockchain system and, in some instances, can be backed by a value-stable asset, such as fiat currency, precious metal, oil, or another commodity. In some embodiments, tokens are utility tokens that provide access to a product or service rendered by an operator of the blockchain system 700 (e.g., a token issuer). In some embodiments, tokens are security tokens, which can be securitized cryptocurrencies that derive from a particular asset, such as bonds, stocks, real estate, and/or fiat currency, or a combination thereof, and can represent an ownership right in an asset or in a combination of assets.

In some embodiments, tokens are NFTs or other non-fungible digital certificates of ownership. In some embodiments, tokens are decentralized finance (DeFi) tokens. DeFi tokens can be used to access feature sets of DeFi software applications (dApps) built on the blockchain system 700. Example dApps can include decentralized lending applications (e.g., Aave), decentralized cryptocurrency exchanges (e.g., Uniswap), decentralized NFT marketplaces (e.g., OpenSea, Rarible), decentralized gaming platforms (e.g., Upland), decentralized social media platforms (e.g., Steemit), decentralized music streaming platforms (e.g., Audius), and/or the like. In some embodiments, tokens provide access rights to various computing systems and can include authorization keys, authentication keys, passwords, PINs, biometric information, access keys, and other similar information. The computing systems to which the tokens provide access can be both on-chain (e.g., implemented as dApps on a particular blockchain system) or off-chain (e.g., implemented as computer software on computing devices that are separate from the blockchain system 700).

As shown, the cryptographic wallet 860 of FIG. 8B is communicatively coupled to the host device 880 (e.g., a mobile phone, a laptop, a tablet, a desktop computer, a wearable device, a point-of-sale (POS) terminal, an automated teller machine (ATM) and the like) via the communications link 855. In some embodiments, the host device 880 can extend the feature set available to the user of the cryptographic wallet 860 when it is coupled to the host device 880. For instance, the host device may provide the user with the ability to perform balance inquiries, convert tokens, access exchanges and/or marketplaces, perform transactions, access computing systems, and/or the like.

In some embodiments, the cryptographic wallet 860 and the host device 880 can be owned and/or operated by the same entity, user, or a group of users. For example, an individual owner of the cryptographic wallet 860 may also operate a personal computing device that acts as a host device 880 and provides enhanced user experience relative to the cryptographic wallet 860 (e.g., by providing a user interface that includes graphical features, immersive reality experience, virtual reality experience, or similar). In some embodiments, the cryptographic wallet 860 and the host device 880 can be owned and/or operated by different entities, users and/or groups of users. For example, the host device 880 can be a point-of-sale (POS) terminal at a merchant location, and the individual owner of the cryptographic wallet 860 may use the cryptographic wallet 860 as a method of payment for goods or services at the merchant location by communicatively coupling the two devices for a short period of time (e.g., via chip, via near-field communications (NFC), by scanning of a bar code, by causing the cryptographic wallet 860 to generate and display a quick response (QR) code, and/or the like) to transmit payment information from the cryptographic wallet 860 to the host device 880.

The cryptographic wallet 860 and the host device 880 can be physically separate and/or capable of being removably coupled. The ability to physically and communicatively uncouple the cryptographic wallet 860 from the host device 880 and other devices enables the air-gapped cryptographic wallet (e.g., cryptographic wallet 860) to act as "cold" storage, where the stored digital assets are moved offline and become inaccessible to the host device 880 and other devices. Further, the ability to physically and communicatively uncouple the cryptographic wallet 860 from the host device 880 allows the cryptographic wallet 860 to be implemented as a larger block of physical memory, which extends the storage capacity of the cryptographic wallet 860, similar to a safety deposit box or vault at a brick-and-mortar facility.

Accordingly, in some embodiments, the cryptographic wallet 860 and the host device 880 are physically separate entities. In such embodiments, the communications link 855 can include a computer network. For instance, the cryptographic wallet 860 and the host device 880 can be paired wirelessly via a short-range communications protocol (e.g., Bluetooth, ZigBee, infrared communication) or via another suitable network infrastructure. In some embodiments, the cryptographic wallet 860 and the host device 880 are removably coupled. For instance, the host device 880 can include a physical port, outlet, opening, or similar to receive and communicatively couple to the cryptographic wallet 860, directly or via a connector.

In some embodiments, the cryptographic wallet 860 includes tangible storage media, such as a dynamic random-access memory (DRAM) stick, a memory card, a secure digital (SD) card, a flash drive, a solid state drive (SSD), a magnetic hard disk drive (HDD), or an optical disc, and/or the like and can connect to the host device via a suitable interface, such as a memory card reader, a USB port, a micro-USB port, an eSATA port, and/or the like.

In some embodiments, the cryptographic wallet 860 can include an integrated circuit, such as a SIM card, a smart cart, and/or the like. For instance, in some embodiments, the cryptographic wallet 860 can be a physical smart card that includes an integrated circuit, such as a chip that can store data. In some embodiments, the cryptographic wallet 860 is a contactless physical smart card. Advantageously, such embodiments enable data from the card to be read by a host device as a series of application protocol data units (APDUs) according to a conventional data transfer protocol between payment cards and readers (e.g., ISO/IEC 7816), which enhances interoperability between the cryptographic payment ecosystem and payment card terminals.

In some embodiments, the cryptographic wallet 860 and the host device 880 are non-removably coupled. For instance, various components of the cryptographic wallet 860 can be co-located with components of the host device 880 in the housing of the host device 880. In such embodiments, the host device 880 can be a mobile device, such as a phone, a wearable, or similar, and the cryptographic wallet 860 can be built into the host device. The integration between the cryptographic wallet 860 and the host device 880 can enable improved user experience and extend the feature set of the cryptographic wallet 860 while preserving computing resources (e.g., by sharing the computing resources, such as transceiver, processor, and/or display or the host device 880). The integration further enables the ease of asset transfer between parties. The integration can further enhance loss protection options, as recovering a password or similar authentication information, rather than recovering a physical device, can be sufficient to restore access to digital assets stored in the cryptographic wallet 860. In some embodiments, the non-removably coupled cryptographic wallet can be air-gapped by, for example, disconnecting the host device 880 from the Internet.

As shown, the cryptographic wallet 860 can include a microcontroller 862. The microcontroller 862 can include or be communicatively coupled to (e.g., via a bus or similar communication pathway) at least a secure memory 864. The cryptographic wallet 860 can further include a transceiver 882a, and input/output circuit 884a, and/or a processor 886a. In some embodiments, however, some or all of these components can be omitted.

In some embodiments, the cryptographic wallet 860 can include a transceiver 882a and therefore can be capable of independently connecting to a network and exchanging electronic messages with other computing devices. In some embodiments, the cryptographic wallet 860 does not include a transceiver 882a. The cryptographic wallet 860 can be capable of connecting to or accessible from a network, via the transceiver 882b of the host device 880, when the cryptographic wallet 860 is docked to the host device 880. For example, in some embodiments, the user of the cryptographic wallet 860 can participate in token exchange activities on decentralized exchanges when the cryptographic wallet 860 is connected to the host device 880.

In some embodiments, the cryptographic wallet 860 can include an input/output circuit 884a, which may include user-interactive controls, such as buttons, sliders, gesture-responsive controls, and/or the like. The user-interactive controls can allow a user of the cryptographic wallet 860 to interact with the cryptographic wallet 860 (e.g., perform balance inquiries, convert tokens, access exchanges and/or marketplaces, perform transactions, access computing systems, and/or the like). In some embodiments, the user can access an expanded feature set, via the input/output circuit 884b of the host device 880, when the cryptographic wallet 860 is docked to the host device 880. For example, host device 880 can include computer-executable code structured to securely access data from the secure memory 864 of the cryptographic wallet 860 and to perform operations using the data. The data can include authentication information, configuration information, asset keys, and/or token management instructions. The data can be used by an application that executes on or by the host device 880. The data can be used to construct application programming interface (API) calls to other applications that require or use the data provided by cryptographic wallet 860. Other applications can include any on-chain or off-chain computer applications, such as dApps (e.g., decentralized lending applications, decentralized cryptocurrency exchanges, decentralized NFT marketplaces, decentralized gaming platforms, decentralized social media platforms, decentralized music streaming platforms), third-party computing systems (e.g., financial institution computing systems, social networking sites, gaming systems, online marketplaces), and/or the like.

The secure memory 864 is shown to include an authentication circuit 866 and a digital asset management circuit 872. The authentication circuit 866 and/or digital asset management circuit 872 include computer-executable code that, when executed by one or more processors, such as one or more processors of processor 886a and/or processor 886b, performs specialized computer-executable operations. For example, the authentication circuit 866 can be structured to cause the cryptographic wallet 860 to establish, maintain and manage a secure electronic connection with another computing device, such as the host device 880. The digital asset management circuit 872 can be structured to cause the cryptographic wallet 860 to allow a user to manage the digital assets accessible via the cryptographic wallet 860. In some embodiments, the authentication circuit 866 and the digital asset management circuit 872 are combined in whole or in part.

As shown, the authentication circuit 866 can include retrievably stored security, authentication, and/or authorization data, such as the authentication key 868. The authentication key 868 can be a numerical, alphabetic, or alphanumeric value or combination of values. The authentication key 868 can serve as a security token that enables access to one or more computing systems, such as the host device 880. For instance, in some embodiments, when the cryptographic wallet 860 is paired or docked to (e.g., establishes an electronic connection with) the host device 880, the user may be prompted to enter authentication information via the input/output circuit(s) of input/output circuit 884*a* and/or input/output circuit 884*b*. The authentication information may include a PIN, a password, a pass phrase, biometric information (e.g., fingerprint, a set of facial features, a retinal scan), a voice command, and/or the like. The authentication circuit 866 can compare the user-entered information to the authentication key 868 and maintain the electronic connection if the items match at least in part.

As shown, the authentication circuit 866 can include retrievably stored configuration information such as configuration information 870. The configuration information 870 can include a numerical, alphabetic, or alphanumeric value or combination of values. These items can be used to enable enhanced authentication protocols. For instance, the configuration information 870 can include a timeout value for an authorized connection between the cryptographic wallet 860 and the host device 880. The configuration information 870 can also include computer-executable code. In some embodiments, for example, where a particular cryptographic wallet, such as cryptographic wallet 860, is set up to pair with only one or a small number of pre-authorized host devices such as host device 880, the configuration information 870 can include a device identifier and/or other device authentication information, and the computer-executable code may be structured to verify the device identifier and/or other device authentication information against the information associated with or provided by the host device 880. When a pairing is attempted, the computer-executable code may initiate or cause the host device 880 to initiate an electronic communication (e.g., an email message, a text message, etc.) using user contact information stored as configuration information 870.

As shown, the digital asset management circuit 872 can include retrievably stored digital asset data, such as the asset key 874. The asset key 874 can be a numerical, alphabetic, or alphanumeric value or combination of values. In some embodiments, the asset key 874 is a private key in a public/private key pair, a portion thereof, or an item from which the private key can be derived. Accordingly, the asset key 874 proves ownership of a particular digital asset stored on a blockchain system 700. The asset key 874 can allow a user to perform blockchain transactions involving the digital asset. The blockchain transactions can include computer-based operations to earn, lend, borrow, long/short, earn interest, save, buy insurance, invest in securities, invest in stocks, invest in funds, send and receive monetary value, trade value on decentralized exchanges, invest and buy assets, sell assets, and/or the like. The cryptographic wallet 860 can be identified as a party to a blockchain transaction on the blockchain system 700 using a unique cryptographically generated address (e.g., the public key in the public/private key pair).

As shown, the digital asset management circuit 872 can also include retrievably stored asset management instructions such as asset management instructions 876. The asset management instructions 876 can include a numerical, alphabetic, or alphanumeric value or combination of values. These items can be used to enable computer-based operations related to managing digital assets identified by the asset key 874. For instance, the asset management instructions 876 can include parameter values, metadata, and/or similar values associated with various tokens identified by the asset key 874 and/or by the blockchain system 700 associated with particular tokens. The asset management instructions 876 can also include computer-executable code. In some embodiments, for example, asset management functionality (e.g., balance inquiry and the like) can be executable directly from the cryptographic wallet 860 rather than or in addition to being executable from the host device 880.

Figure 9:
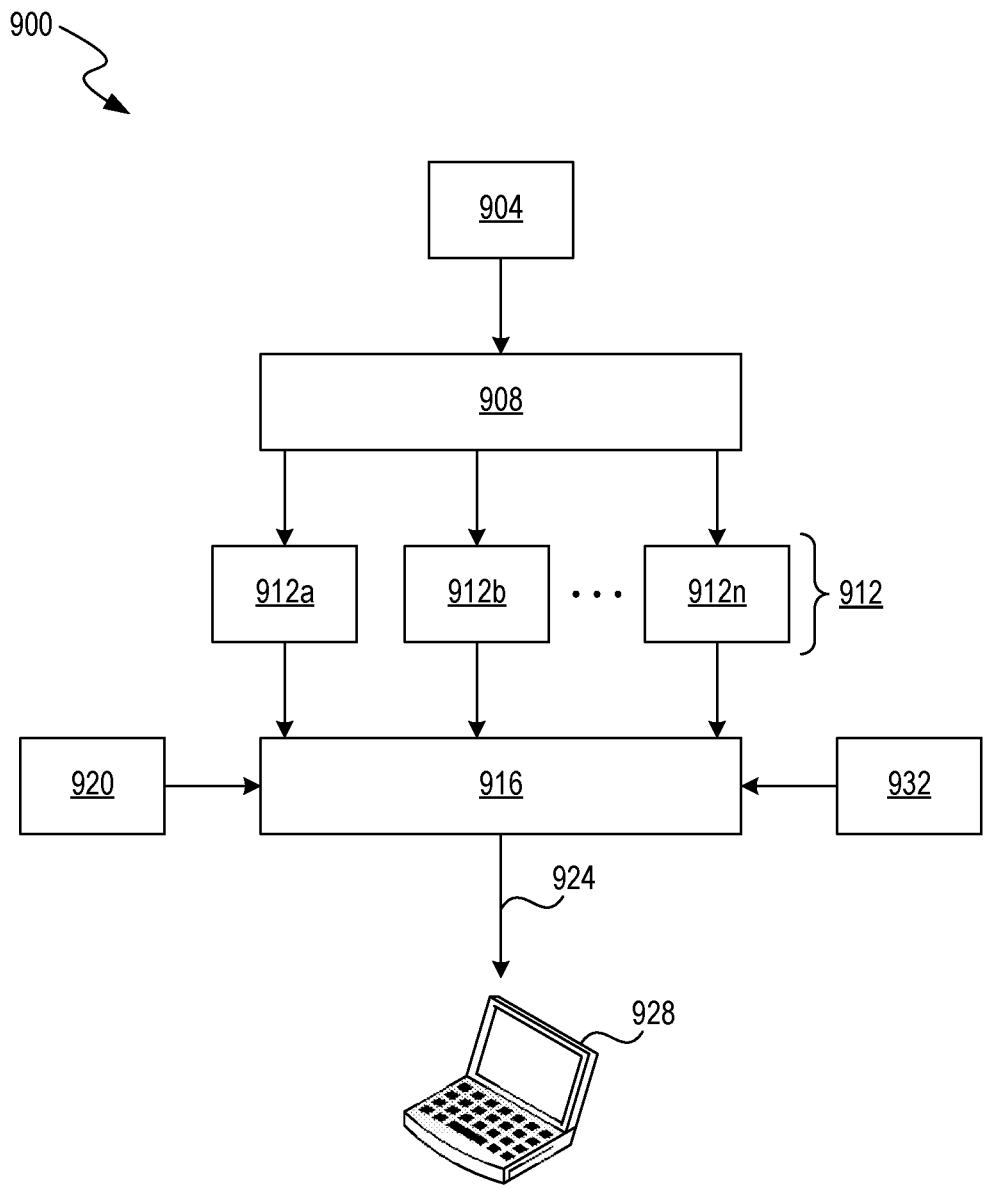
FIG. 9 is a block diagram illustrating an example machine learning (ML) system, in accordance with one or more embodiments of this disclosure.

FIG. 9 is a block diagram illustrating an example machine learning (ML) system 900. The ML system 900 is implemented using components of the example computer system 1000 illustrated and described in more detail with reference to FIG. 10. For example, the ML system 900 can be implemented on the computer system 1000 using instructions 1008 programmed in the main memory 1006 illustrated and described in more detail with reference to FIG. 8A. Likewise, embodiments of the ML system 900 can include different and/or additional components or be connected in different ways. The ML system 900 is sometimes referred to as a ML module.

The ML system 900 includes a feature extraction module 908 implemented using components of the example computer system 1000 illustrated and described in more detail with reference to FIG. 8A. In some embodiments, the feature extraction module 908 extracts a feature vector 912 from input data 904. The feature vector 912 includes features 912*a*, 912*b*, . . . , 912*n*. The feature vector 912 can include user preferences and characteristics of a camera. The feature extraction module 908 reduces the redundancy in the input data 904, e.g., repetitive data values, to transform the input data 904 into the reduced set of features such as feature vector 912, e.g., features 912*a*, 912*b*, . . . , 912*n*. The feature vector 912 contains the relevant information from the input data 904, such that events or data value thresholds of interest can be identified by the ML model 916 by using this reduced representation. In some example embodiments, the following dimensionality reduction techniques are used by the feature extraction module 908: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

In some embodiments, the ML model 916 performs deep learning (also known as deep structured learning or hierarchical learning) directly on the input data 904 to learn data representations, as opposed to using task-specific algorithms. In deep learning, no explicit feature extraction is performed; the features of feature vector 912 are implicitly extracted by the ML system 900. For example, the ML model 916 can use a cascade of multiple layers of nonlinear processing units for implicit feature extraction and transformation. Each successive layer uses the output from the previous layer as input. The ML model 916 can thus learn in supervised (e.g., classification) and/or unsupervised (e.g., pattern analysis) modes. The ML model 916 can learn multiple levels of representations that correspond to different levels of abstraction, wherein the different levels form a hierarchy of concepts. In this manner, the ML model 916 can be configured to differentiate features of interest from background features.

In one example, the ML model 916, e.g., in the form of a CNN generates the output 924, without the need for feature extraction, directly from the input data 904. In some examples, the output 924 is provided to the computer device 928 or video display 1018. The computer device 928 is a server, computer, tablet, smartphone, smart speaker, etc., implemented using components of the example computer system 1000 illustrated and described in more detail with reference to FIG. 8A. In some embodiments, the steps performed by the ML system 900 are stored in memory on the computer device 928 for execution.

A CNN is a type of feed-forward artificial neural network in which the connectivity pattern between its neurons is inspired by the organization of a visual cortex. Individual cortical neurons respond to stimuli in a restricted area of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing.

The ML model 916 can be a CNN that includes both convolutional layers and max pooling layers. The architecture of the ML model 916 can be "fully convolutional," which means that variable sized sensor data vectors can be fed into it. For all convolutional layers, the ML model 916 can specify a kernel size, a stride of the convolution, and an amount of zero padding applied to the input of that layer. For the pooling layers, the ML model 916 can specify the kernel size and stride of the pooling.

In some embodiments, the ML system 900 trains the ML model 916, based on the training data 920, to correlate the feature vector 912 to expected outputs in the training data 920. As part of the training of the ML model 916, the ML system 900 forms a training set of features and training labels by identifying a positive training set of features that have been determined to have a desired property in question, and, in some embodiments, forms a negative training set of features that lack the property in question.

The ML system 900 applies ML techniques to train the ML model 916, that when applied to the feature vector 912, outputs indications of whether the feature vector 912 has an associated desired property or properties, such as a probability that the feature vector 912 has a particular Boolean property, or an estimated value of a scalar property. The ML system 900 can further apply dimensionality reduction (e.g., via linear discriminant analysis (LDA), PCA, or the like) to reduce the amount of data in the feature vector 912 to a smaller, more representative set of data.

The ML system 900 can use supervised ML to train the ML model 916, with feature vectors of the positive training set and the negative training set serving as the inputs. In some embodiments, different ML techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., are used. In some example embodiments, a validation set 932 is formed of additional features, other than those in the training data 920, which have already been determined to have or to lack the property in question. The ML system 900 applies the trained ML model (e.g., ML model 916) to the features of the validation set 932 to quantify the accuracy of the ML model 916. Common metrics applied in accuracy measurement include: Precision and Recall, where Precision refers to a number of results the ML model 916 correctly predicted out of the total it predicted, and Recall is a number of results the ML model 916 correctly predicted out of the total number of features that had the desired property in question. In some embodiments, the ML system 900 iteratively re-trains the ML model 916 until the occurrence of a stopping condition, such as the accuracy measurement indication that the ML model 916 is sufficiently accurate, or a number of training rounds having taken place. The validation set 932 can include data corresponding to confirmed environmental features, object motion, any other type of training set, or combinations thereof. This allows the detected values to be validated using the validation set 932. The validation set 932 can be generated based on analysis to be performed.

In some embodiments, ML system 900 is a generative artificial intelligence or generative AI system capable of generating text, images, or other media in response to prompts. Generative AI systems use generative models such as large language models to produce data based on the training data set that was used to create them. A generative AI system is constructed by applying unsupervised or self-supervised machine learning to a data set. The capabilities of a generative AI system depend on the modality or type of the data set used. For example, generative AI systems trained on words or word tokens are capable of natural language processing, machine translation, and natural language generation and can be used as foundation models for other tasks. In addition to natural language text, large language models can be trained on programming language text, allowing them to generate source code for new computer programs. Generative AI systems trained on sets of images with text captions are used for text-to-image generation and neural style transfer.

Figure 10:
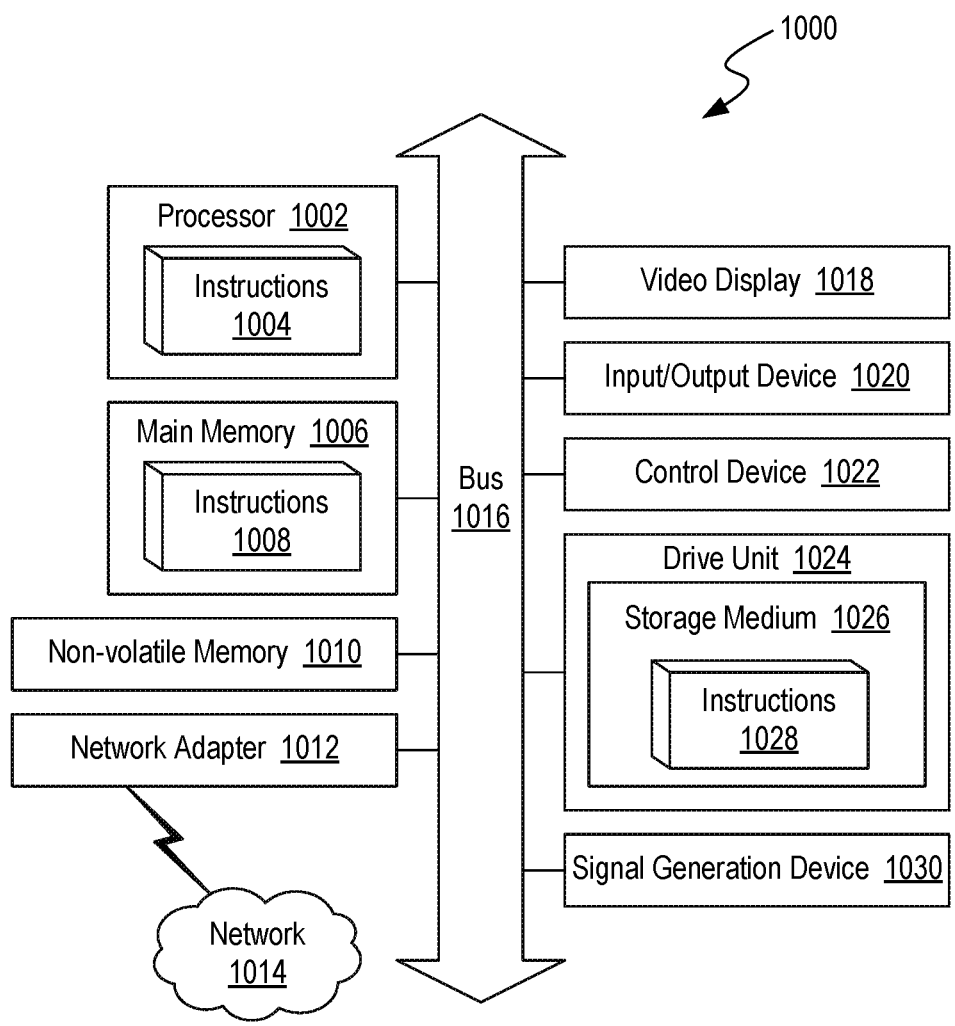
FIG. 10 is a block diagram illustrating an example computer system, in accordance with one or more embodiments of this disclosure.

FIG. 10 is a block diagram illustrating an example computer system 1000, in accordance with one or more embodiments. In some embodiments, components of the example computer system 1000 are used to implement the blockchain system 700 or the ML system 900 illustrated and described in more detail with reference to FIGS. 7 and 9. At least some operations described herein can be implemented on the computer system 1000.

The computer system 1000 can include one or more central processing units ("processors") such as one or more processors 1002, and can further include main memory 1006, non-volatile memory 1010, network adapter 1012 (e.g., network interface), video displays 1018, input/output devices 1020, control devices 1022 (e.g., keyboard and pointing devices), drive units 1024 including a storage medium 1026, and a signal generation device 1030 that are communicatively connected to a bus 1016. The bus 1016 is illustrated as an abstraction that represents one or more physical buses and/or point-to-point connections that are connected by appropriate bridges, adapters, or controllers. The bus 1016, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 1000 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 1000.

While the main memory 1006, non-volatile memory 1010, and storage medium 1026 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1028. The term "machine-readable medium" and "storage medium" shall also be taken to include any medium that is capable of storing, encoding, or carrying a set of instructions for execution by the computer system 1000.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 1004, 1008, 1028) set at various times in various memory and storage devices in a computer device. When read and executed by the one or more processors 1002, the instruction(s) cause the computer system 1000 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and/or non-volatile memory 1010, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 1012 enables the computer system 1000 to mediate data in a network 1014 with an entity that is external to the computer system 1000 through any communication protocol supported by the computer system 1000 and the external entity. The network adapter 1012 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 1012 can include a firewall that governs and/or manages permission to access proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application, and the circumstances under which the permission rights stand.

Figure 11:
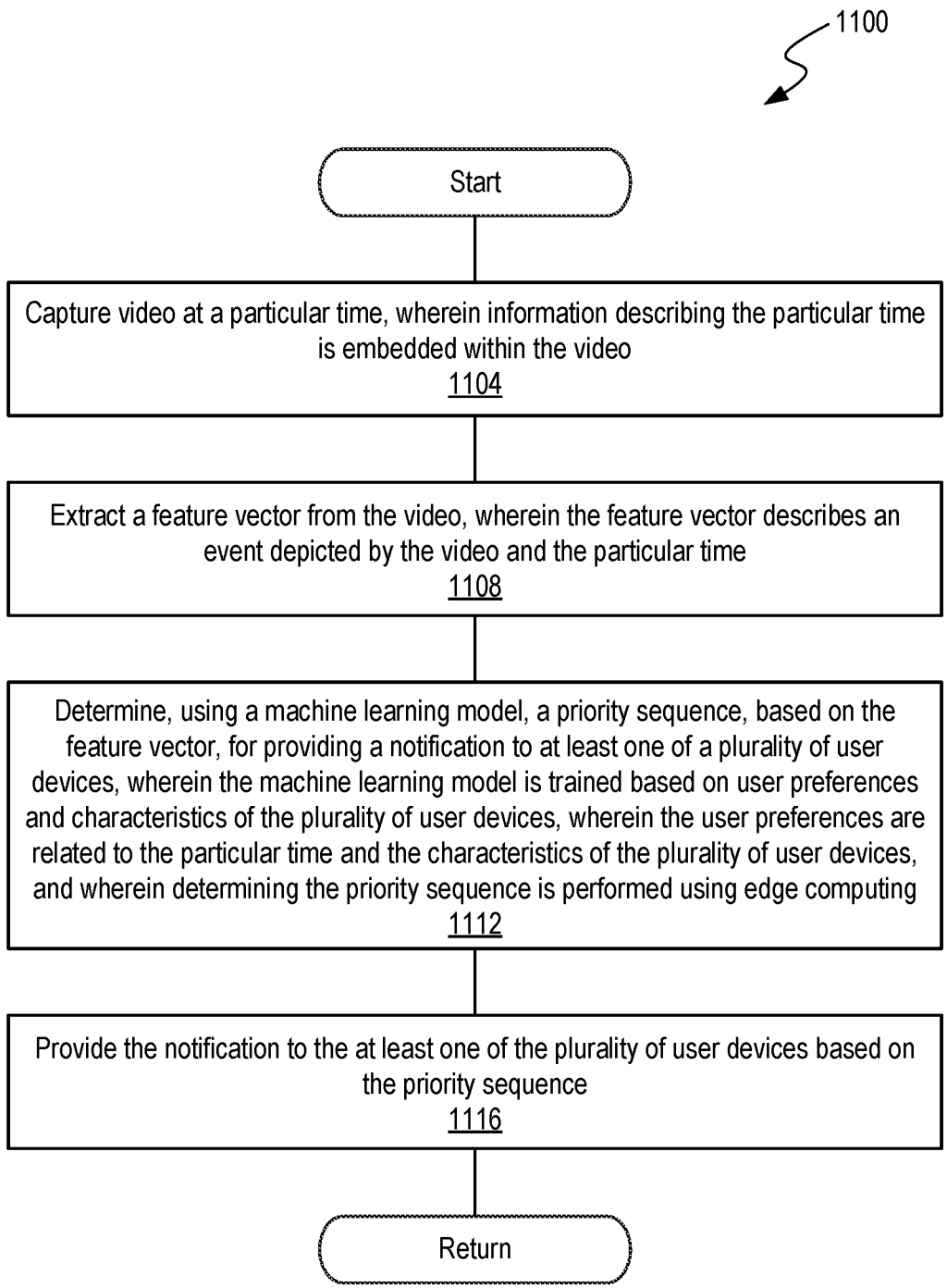
FIG. 11 is a flow diagram illustrating an example process for implementing notification priority sequencing for video security, in accordance with one or more embodiments of this disclosure.

FIG. 11 is a flow diagram illustrating a process 1100 for implementing notification priority sequencing for video security, in accordance with one or more embodiments of this disclosure. In some implementations, process 1100 is performed by base station 135 or camera 105 described in more detail with reference to FIG. 1. In some implementations, the process is performed by a computer system, e.g., the example computer system 1100 illustrated and described in more detail with reference to FIG. 11. Particular entities, for example, an XR device, a blockchain node, or an ML system perform some or all of the steps of process 1100 in other implementations. Likewise, implementations can include different and/or additional steps or can perform the steps in different orders.

In some embodiments, edge computing is performed to implement notification priority sequencing for video security. In such implementations, processing is performed on a camera itself, obviating the need to connect to a base station. The camera can process data and send results directly to user devices, e.g., devices 160 illustrated and described in more detail with reference to FIG. 1. In some embodiments, at least one of the user devices is an extended-reality headset. An example extended-reality headset is illustrated and described in more detail with reference to FIG. 6.

In act 1104, a computer system implemented on a camera causes the camera to capture video at a particular time, e.g., 10 am ET on a Monday morning. Information identifying the camera and the particular time is embedded within the video. For example, the information can be embedded using texture masking or using a multi-dimensional lattice structure for encoding signature information in the video. The information can be embedded in individual video frames and then MPEG-2 encoded. Information identifying the camera can include a location of the camera and/or operational characteristics of the camera.

In act 1108, the computer system extracts a feature vector from the video. Feature extraction is illustrated and described in more detail with reference to FIG. 9. The feature vector describes an event depicted by the video and the particular time. For example, the event is a delivery person appearing at a front door of a house, a passenger in an airport walking past the camera, or a cat jumping into the backyard of a house. Some benign events (e.g., a cat jumping) will not result in notifications to user devices. The features extracted can identify objects identified, motion identified, direction of motion, etc. A particular feature can capture the time at which the video was captured, such as, 3 am ET on a Thursday night.

In act 1112, the computer system determines a priority sequence for providing a notification to at least one of multiple user devices, e.g., devices 160. In some embodiments, the notification is generated, using a generative artificial intelligence (AI) model, based on the event depicted by the video. Generative AI models are described in more detail with reference to FIG. 9. For example, text, graphics, icons, animation of the notification is generated using a generative AI model. The generative AI model can also be trained on user preferences as to text and graphics to be used. The priority sequence is determined based on the feature vector using a machine learning model embedded in the camera. The priority sequence is the same as or similar to priority information 140 are illustrated and described in more detail with reference to FIG. 1. Example machine learning and artificial intelligence techniques for implementing notification priority sequencing for video security are illustrated and described in more detail with reference to FIG. 9.

In some embodiments, the machine learning model is trained based on user preferences and characteristics of the user devices. For example, a user can specify that notifications on weekdays be sent to device 160*a* first and then to device 160*b*. The user can specify that notifications on weekends be sent to device 160*b* first and then to device 160*a*. The user can specify that notifications about delivery persons at the front door be sent only to device 160*a*. The user can specify that notifications about passengers at an airport matching a particular description be sent to a particular device. In some embodiments, the user preferences are related to the particular time (e.g., nighttime events, daytime events, or weekend events) and the characteristics of the user devices. Operational characteristics of user devices are described in more detail with reference to FIGS. 1 and 3.

In some embodiments, the computer system retrieves a first location of a first user device and a second location of a second user device from a cloud server. Determining the priority sequence is based on the first location and the second location. For example, a notification is sent first to a device that is nearest to a particular business or home location. In an example, a notification is not sent to a device that is located at a particular business or that is located within a particular distance from a particular location.

In some embodiments, determining the priority sequence is performed using edge computing. Edge computing is a distributed computing paradigm that brings computation and data storage closer to the sources of data, e.g., cameras. As a result, the embodiments disclosed herein improve response times and save bandwidth. In some implementations, the cameras described herein are Internet of things (IoT) devices. The camera performs processing using edge computing while obviating the need to connect to a computer network.

In act 1112, the computer system provides the notification to the at least one of the multiple user devices based on the priority sequence. Examples of providing notifications are described in more detail with reference to FIGS. 1-3. In some embodiments, the computer system generates an extended-reality version of the video based on the user preferences. Extended-reality technology is illustrated and described in more detail with reference to FIGS. 5-6. The user preferences can specify that the extended-reality version of the video should be captioned with a textual description of an event depicted by the video. The user preferences can specify that the extended-reality version of the video should be captioned with a textual description of an object or a person identified in the video. The user preferences can specify that the extended-reality version of the video should be captioned with a textual description of a location depicted by the video. The computer system sends the extended-reality version of the video to the at least one of the plurality of user devices.

In some embodiments, the camera receives a request to access the camera from at least one of the user devices. The request includes an identifier based on self-sovereign identity. Self-sovereign identity is described in more detail with reference to FIG. 7. The identifier can be a cryptographic identifier stored in a cryptographic wallet of a user device. Example cryptographic wallets are illustrated and described in more detail with reference to FIG. 8B.

The functions performed in the processes and methods can be implemented in differing order. Furthermore, the outlined steps and operations are only provided as examples, and some of the steps and operations can be optional, combined into fewer steps and operations, or expanded into additional steps and operations without detracting from the essence of the disclosed embodiments.

While processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations, or may be replicated (e.g., performed multiple times). Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms can on occasion be used interchangeably.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Physical and functional components (e.g., devices, engines, modules, and data repositories, etc.) associated with processing device 600 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). Other arrays, systems and devices described above may include additional, fewer, or different functional components for various applications.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

From the foregoing, it will be appreciated that specific embodiments of the invention have been described herein for purposes of illustration, but that various modifications can be made without deviating from the scope of the invention. Accordingly, the invention is not limited except as by the appended claims.

We claim:

1. A camera comprising:
at least one hardware processor; and
at least one non-transitory memory storing instructions, which, when executed by the at least one hardware processor, cause the camera to:
capture video at a particular time,
wherein information describing the particular time is embedded within the video;
extract a feature vector from the video,
wherein the feature vector describes an event depicted by the video and the particular time;
determine, using a machine learning model embedded in the camera, a priority sequence, based on the feature vector, for providing a notification to at least one of a plurality of user devices,
wherein the machine learning model is trained based on user preferences and characteristics of the plurality of user devices,
wherein the user preferences are related to the particular time and the characteristics of the plurality of user devices, and
wherein determining the priority sequence is performed using edge computing; and
provide the notification to the at least one of the plurality of user devices based on the priority sequence.

2. The camera of claim 1, wherein the instructions cause the camera to:
generate an extended-reality version of the video based on the user preferences; and
send the extended-reality version of the video to the at least one of the plurality of user devices.

3. The camera of claim 1, wherein the instructions cause the camera to:
generate the notification, using a generative artificial intelligence (AI) model, based on the event depicted by the video.

4. The camera of claim 1, wherein the instructions cause the camera to:
receive, from the at least one of the plurality of user devices, a request to access the camera using an identifier based on self-sovereign identity.

5. The camera of claim 1, wherein the at least one of the plurality of user devices is an extended-reality headset.

6. The camera of claim 1, wherein the instructions cause the camera to:
retrieve, from a cloud server, a first location of a first user device of the plurality of user devices and a second location of a second user device of the plurality of user devices,
wherein determining the priority sequence is based on the first location and the second location.

7. A computer-implemented method comprising:
receiving, by a computer system, a video captured by a camera at a particular time,
wherein information describing the particular time is embedded within the video;
extracting a feature vector from the video,
wherein the feature vector describes an event depicted by the video and the particular time;
determining, using a machine learning model, a priority sequence, based on the feature vector, for providing a notification, based on the video, to at least one of a plurality of user devices,
wherein the machine learning model is trained based on user preferences and characteristics of the plurality of user devices; and
providing the notification to the at least one of the plurality of user devices based on the priority sequence.

8. The method of claim 7, wherein the computer system and the machine learning model are embedded within the camera, and
wherein determining the priority sequence is performed using edge computing.

9. The method of claim 7, comprising:
generating an extended-reality version of the video based on the user preferences, wherein the user preferences are related to the particular time; and
sending the extended-reality version of the video to the at least one of the plurality of user devices.

10. The method of claim 7, wherein the computer system is implemented on a base station, the method comprising:
generating the notification, using a generative artificial intelligence (AI) model, based on an event depicted by the video.

11. The method of claim 7, wherein the computer system is implemented on a base station, the method comprising:
receiving, from the at least one of the plurality of user devices, a request to access the camera using an identifier based on self-sovereign identity.

12. The method of claim 7, wherein the at least one of the plurality of user devices is an extended-reality headset.

13. The method of claim 7, comprising retrieving, from a cloud server, a first location of a first user device of the plurality of user devices and a second location of a second user device of the plurality of user devices,
wherein determining the priority sequence is based on the first location and the second location.

14. A base station comprising:
at least one non-transitory memory storing instructions, which, when executed by at least one hardware processor, cause the base station to:
receive video, from a camera, at a particular time,
wherein information identifying the camera and the particular time is embedded within the video;
extract a feature vector from the video,
wherein the feature vector describes the particular time;
generate, using a machine learning model, an extended-reality version of the video based on the feature vector and user preferences;
determine, using the machine learning model, a priority sequence, based on the feature vector, for providing the extended-reality version of the video to at least one of a plurality of user devices; and
send the extended-reality version of the video to the at least one of the plurality of user devices based on the priority sequence.

15. The base station of claim 14, wherein the machine learning model is trained based on the user preferences and characteristics of the plurality of user devices.

16. The base station of claim 14, wherein the machine learning model is a generative artificial intelligence (AI) model, and
wherein the extended-reality version of the video is based on an event depicted by the video.

17. The base station of claim 14, wherein the instructions cause the base station to:
receive, from the at least one of the plurality of user devices, a request to access the camera using an identifier based on self-sovereign identity.

18. The base station of claim 14, wherein the at least one of the plurality of user devices is an extended-reality headset.

19. The base station of claim 14, wherein the instructions cause the base station to:
retrieve, from a cloud server, a first location of a first user device of the plurality of user devices and a second location of a second user device of the plurality of user devices,
wherein determining the priority sequence is based on the first location and the second location.

20. The base station of claim 14, wherein the user preferences are related to the particular time.

* * * * *